(12) United States Patent
Wang et al.

(10) Patent No.: US 12,183,115 B2
(45) Date of Patent: Dec. 31, 2024

(54) EMBEDDED ULTRASONIC TRANSDUCERS

(71) Applicant: Apple Inc., Cupertino, CA (US)

(72) Inventors: Qi Wang, Santa Clara, CA (US); Jere C. Harrison, Redwood City, CA (US); Mi Hye Shin, Santa Clara, CA (US); Yunhan Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/931,458

(22) Filed: Sep. 12, 2022

(65) Prior Publication Data
US 2023/0099288 A1    Mar. 30, 2023

Related U.S. Application Data

(60) Provisional application No. 63/261,657, filed on Sep. 24, 2021.

(51) Int. Cl.
G06V 40/13 (2022.01)
B06B 1/06 (2006.01)
G01L 1/16 (2006.01)
G06F 1/16 (2006.01)
G06F 3/043 (2006.01)

(52) U.S. Cl.
CPC ........ G06V 40/1306 (2022.01); B06B 1/0622 (2013.01); G01L 1/16 (2013.01); G06F 1/163 (2013.01); G06F 3/043 (2013.01)

(58) Field of Classification Search
CPC ......... G06F 1/163; G06F 3/043; A61B 5/681; A44C 5/14; G06V 40/1306; G01L 1/16
See application file for complete search history.

(56) References Cited

U.S. PATENT DOCUMENTS

| | | | |
|---|---|---|---|
| 10,959,025 B2 | 3/2021 | Lee et al. | |
| 2004/0014567 A1* | 1/2004 | Mendel | A63B 24/00 482/8 |
| 2015/0131539 A1* | 5/2015 | Tsfaty | H04B 11/00 370/329 |

(Continued)

OTHER PUBLICATIONS

Iravantchi et al., "BeamBand: Hand Gesture Sensing with Ultrasonic Beamforming", CHI '19: Proceedings of the 2019 CHI Conference on Human Factors in Computing, Glasgow, Scotland, UK, May 4-9, 2019, pp. 1-10.

Primary Examiner — Yuzhen Shen
(74) Attorney, Agent, or Firm — Kubota & Basol LLP

(57) ABSTRACT

Examples of the disclosure are directed to micro-machined ultrasonic transducers (MUTs) which can be embedded into a flexible band of a watch to detect touch, gestures, physiological signals, and transfer data. In some examples, the MUTs can include a piezoelectric material disposed between two electrodes and coupled to a base material having a plurality of cavities, to support motion of the transducer structure. In some examples, the MUTs can be coupled to multiplexing circuitry to stimulate, configure and control the MUTs. In some examples, the size, shape, and arrangement of transducers can be changed to improve characteristics associated with ultrasonic transmission. In some examples, the MUT array can be driven (e.g., by the CMOS circuitry) to beamform the transmitted and/or the received ultrasonic waves. In some examples, the one or more MUT arrays can be configured to generate haptic feedback via the flexible band.

16 Claims, 14 Drawing Sheets

(56) References Cited

U.S. PATENT DOCUMENTS

| | | |
|---|---|---|
| 2016/0018948 A1* | 1/2016 | Parvarandeh ........... G06F 1/163 |
| | | 345/175 |
| 2017/0041564 A1* | 2/2017 | Konstantatos .... H01L 27/14614 |
| 2017/0048623 A1* | 2/2017 | Qutub .................. H04R 19/005 |
| 2017/0110504 A1* | 4/2017 | Panchawagh ......... B06B 1/0207 |
| 2019/0188365 A1* | 6/2019 | Gurin ...................... G06F 21/32 |
| 2019/0269914 A1 | 9/2019 | Moaddeb et al. |
| 2021/0019487 A1* | 1/2021 | Chau ................. G06V 40/1306 |
| 2021/0160622 A1 | 5/2021 | Lee et al. |
| 2021/0296008 A1* | 9/2021 | Novak, Jr. ........... H04B 17/318 |
| 2021/0397802 A1* | 12/2021 | Arellano ................. G06F 3/167 |

* cited by examiner

EMBEDDED ULTRASONIC TRANSDUCERS

CROSS-REFERENCE TO RELATED APPLICATIONS

This application claims the benefit of U.S. Provisional Application No. 63/261,657, filed Sep. 24, 2021, the content of which is incorporated herein by reference in its entirety for all purposes.

FIELD OF THE DISCLOSURE

This relates generally to user interaction, and more particularly to transducers embedded within a flexible band and used to detect gestures, features, and properties of a user.

BACKGROUND OF THE DISCLOSURE

Many types of input can be provided for performing operations in a computing system, such as buttons or keys, mice, trackballs, joysticks, touch sensor panels, touch screens and the like. In addition, other types of input such as audio input (e.g., voice commands), touch input, and user gestures can also be provided as inputs. In particular, touch and gestures can be provided as inputs to interfaces including capacitive touch screens. However, devices can suffer from a limited area of interaction (i.e., the area of a touch screen), thus increasing the friction of human-to-computer interaction.

SUMMARY OF THE DISCLOSURE

Examples of the disclosure are directed to micro-machined ultrasonic transducers (MUTs) which can be embedded into a flexible band of a watch or other wrist-worn device to detect touch, gestures, physiological signals, and transfer data. In some examples, the MUTs can include a piezoelectric material disposed between two electrodes, and coupled to a base material having a plurality of cavities, or voids, to support motion of the transducer structure and enforce acoustic transmission directivity. In some examples, the MUTs can be arranged in an array. In some examples, the MUTs can be coupled to multiplexing circuitry (e.g., complimentary metal-oxide field effect transistors (CMOS) circuitry) to stimulate, configure, and control the MUTs. In some examples, the base material can be formed from the same material as the flexible band. In some examples, the MUT arrays can be configured to transmit and receive ultrasonic signals to detect objects in contact with and/or in proximity to the flexible band. In some examples, the MUTs can be bulk structures that do not include cavities. In some examples, a plurality of top electrodes of an MUT array can be arranged in rows, and a plurality of bottom electrodes of the MUT array can be arranged in columns. In some examples, the size, shape, and arrangement of transducers can be changed to improve characteristics associated with ultrasonic transmission. In some examples, the MUT array can be driven (e.g., by the CMOS circuitry) to beamform the transmitted and/or the received ultrasonic waves. In some examples, pins of a watch or other wrist-worn device can be coupled via flexible circuits to one or more MUT arrays embedded within the flexible band of the watch. In some examples, contact on the flexible band can be detected. In some examples, a fingerprint in contact with the flexible band can be detected. In some examples, touch gestures across the flexible band can be detected. In some examples, the one or more MUT arrays can be configured to detect gestures in proximity to the flexible band. In some examples, the one or more MUT arrays can be configured to generate haptic feedback via the flexible band. In some examples, the one or more MUT arrays can be configured to detect physiological signals of a user of the device, including blood pressure and blood vessel dimensions. In some examples, data can be transferred between one or more watches or other wrist-worn devices via the ultrasonic transducers. In some examples, the data can be textual content, including messages. In some examples, the data can be indicative of a social distance between users of the two or more watches or other wrist-worn devices. In some examples, data can be transferred between a watch and another device, such as a phone and/or a watch, to unlock functionality of the other device.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Examples of the disclosure are directed to micro-machined ultrasonic transducers (MUTs) can be embedded into a flexible band of a watch or other wrist-worn device to detect touch, gestures, physiological signals, and transfer data. In some examples, the MUTs can include a piezoelectric material disposed between two electrodes, and coupled to a base material having a plurality of cavities, or voids, to support motion of the transducer structure and enforce acoustic transmission directivity. In some examples, the MUTs can be arranged in an array. In some examples, the MUTs can be coupled to multiplexing circuitry (e.g., CMOS circuitry) to stimulate, configure, and control the MUTs. In some examples, the base material can be formed from the same material as the flexible band. In some examples, the MUT arrays can be configured to transmit and receive ultrasonic signals to detect objects in contact with and/or in proximity to the flexible band. In some examples, the MUTs can be bulk structures that do not include cavities. In some examples, a plurality of top electrodes of an MUT array can be arranged in rows, and a plurality of bottom electrodes of the MUT array can be arranged in columns. In some examples, the size, shape, and arrangement of transducers can be changed to improve characteristics associated with ultrasonic transmission. In some examples, the MUT array can be driven (e.g., by the multiplexing circuitry) to beamform the transmitted and/or the received ultrasonic waves. In some examples, pins of a watch or other wrist-worn device can be coupled via flexible circuits to one or more MUT arrays embedded within the flexible band of the watch. In some examples, contact on the flexible band can be detected. In some examples, a fingerprint in contact with the flexible band can be detected. In some examples, touch gestures across the flexible band can be detected. In some examples, the one or more MUT arrays can be configured to detect gestures in proximity to the flexible band. In some examples, the one or more MUT arrays can be configured to generate haptic feedback via the flexible band. In some examples, the one or more MUT arrays can be configured to detect physiological signals of a user of the device, including blood pressure and blood vessel dimensions. In some examples, data can be transferred between one or more watches or other wrist-worn devices via the ultrasonic transducers. In some examples, the data can be textual content, including messages. In some examples, the data can be indicative of a social distance between users of the two or more watches or other wrist-worn devices.

Figure 1A:
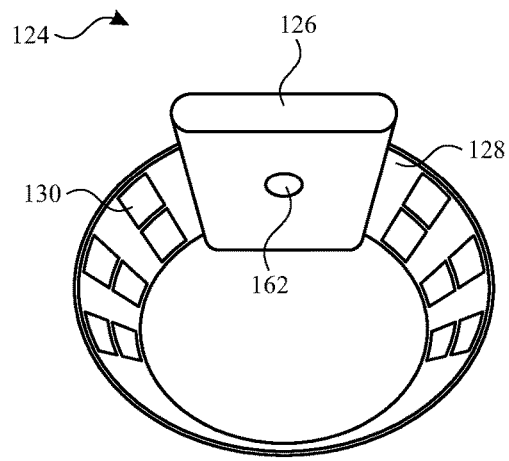
FIGS. 1A-D illustrate example devices in which transducers can be woven into a flexible band to detect touch, gestures, physiological signals, and to transmit data according to some examples of the disclosure.
Figure 1B:
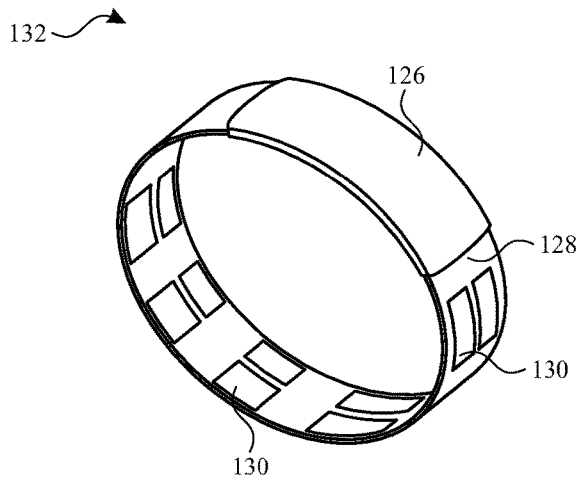
Figure 1C:
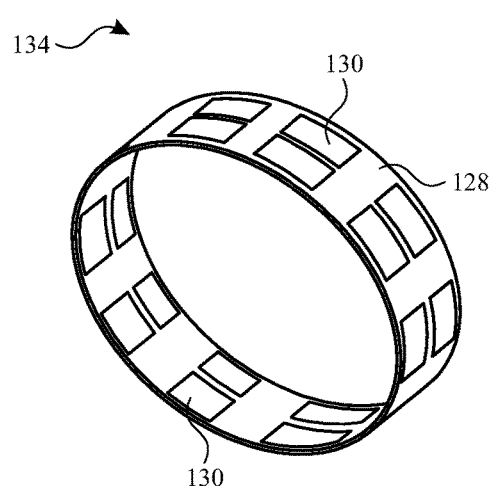
Figure 1D:
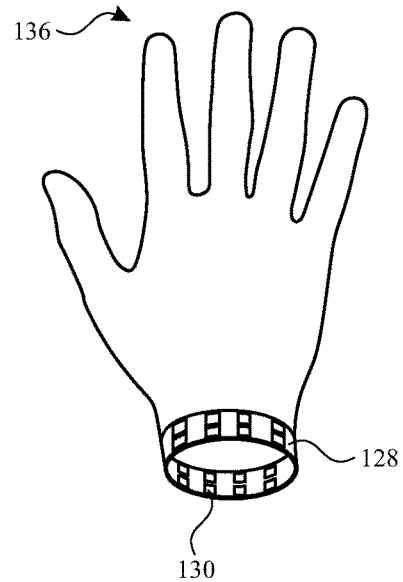

FIGS. 1A-1D illustrate example devices in which ultrasonic transducers can be woven into a flexible band to detect touch, gestures, hand movements, and physiological signals according to some examples of the disclosure. FIG. 1A illustrates an example wearable device 124 having a housing 126 optionally including one or more electrodes 162, and flexible band 128 including a plurality of transducer arrays 130. FIG. 1B illustrates an example activity or wearable device 132 having casing or housing 126 and flexible band or strap 128 including a plurality of transducers arrays 130. FIG. 1C illustrates an example fabric fashion accessory 134 having flexible band 128 including a plurality of transducers arrays 130. In the example of FIG. 1C, one or more wireless communication modules (e.g., a Bluetooth Low Energy radio module, a Zigbee module) may be needed to facilitate transmission and/or reception of transducer array signals to a separate device (e.g., a smartphone or other handheld or wearable device) for processing. FIG. 1D illustrates an example glove 136 (e.g., for AR/VR applications) having flexible band 128 including a plurality of transducer arrays 130. In the example of FIG. 1D, one or more wireless communication modules (e.g., a Bluetooth Low Energy radio module, a Zigbee module) may be needed to facilitate transmission and/or reception of transducer arrays signals to a separate device (e.g., a smartphone or other handheld or wearable device) for processing. In any or all of FIGS. 1A-1D, transducer arrays 130 can be located on the outer surfaces, the inner surfaces, or both surfaces of the flexible band, strap or cuff, or located central to the band, strap or cuff, to enable the transmission and reception of ultrasonic signals on the outer and/or inner surfaces of the band, strap or cuff.

Figure 2:
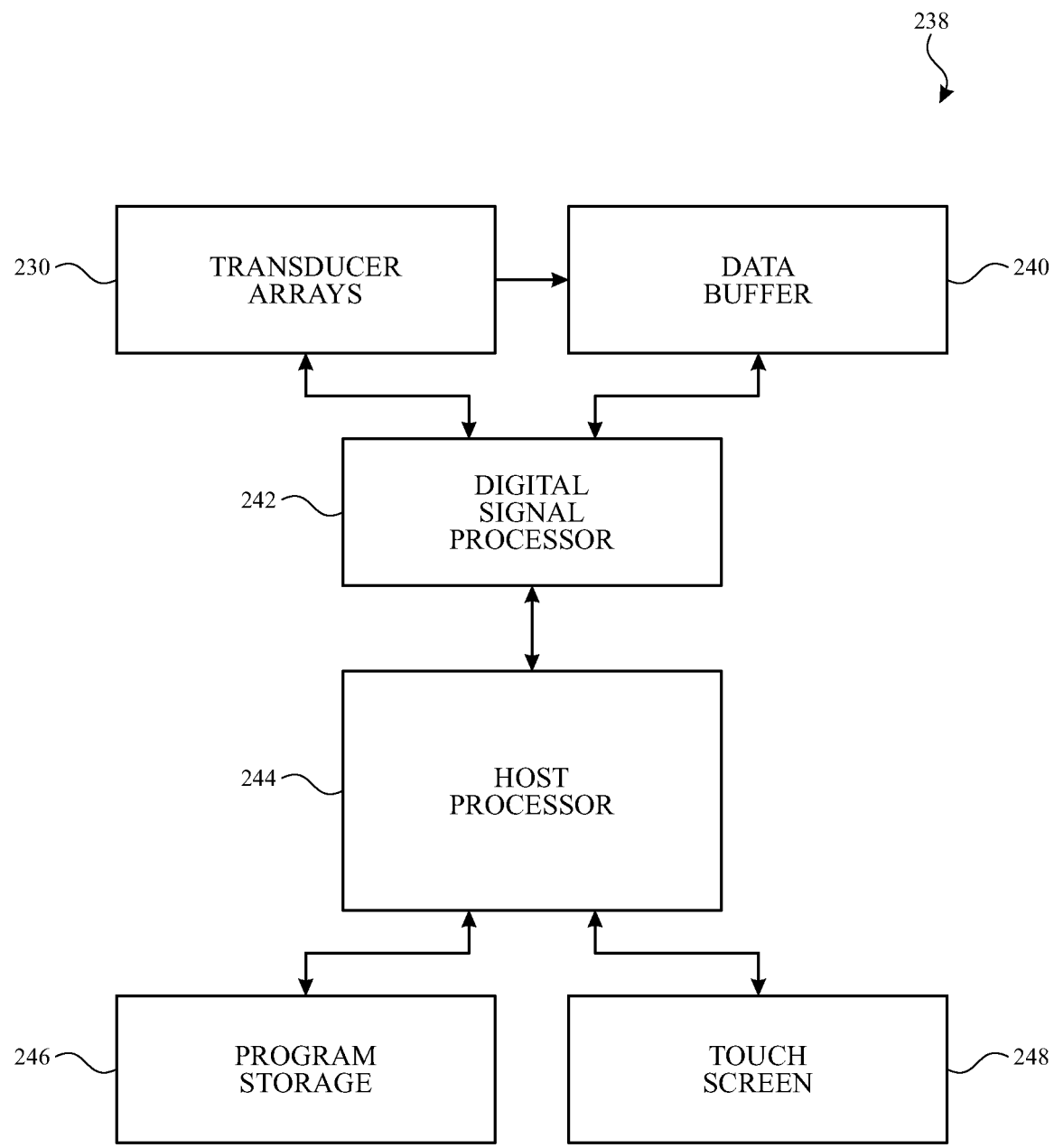
FIG. 2 illustrates a block diagram of an example computing system that illustrates one implementation of touch, gesture, and physiological signal capture and processing according to some examples of the disclosure.

FIG. 2 illustrates a block diagram of an example computing system 238 that illustrates one implementation of touch, gesture, and physiological signal capture and processing according to some examples of the disclosure. Portions of computing system 238 can be included in, for example, wearable devices 124 or 132 and/or any separate mobile or non-mobile, wearable or non-wearable computing device for touch, gesture, and physiological signal analysis and/or display. Computing system 238 can include one or more transducer arrays 230 (e.g., ultrasonic transducer arrays) to measure touch, recognize gestures, and monitor physiological signals from a person contacting a flexible band of computing system 238, data buffer 240 (or other volatile or non-volatile memory or storage) to store temporarily (or permanently) the signals from the transducer arrays 230, digital signal processor (DSP) 242 to analyze and process the signals, host processor 244, program storage 246, and in some examples, touch screen 248 to perform display operations. In some examples, touchscreen 248 may be replaced by a non-touch sensitive display.

Host processor 244 can be electrically coupled to program storage 246 to execute instructions stored in program storage 246 (e.g., a non-transitory computer-readable storage medium). Host processor 244 can, for example, provide control and data signals to generate a display image on touch screen 248, such as a display image of a user interface (UI). Host processor 244 can also receive outputs from DSP 242 and perform actions based on the outputs (e.g., display detected touch and/or gestures, play a sound, provide haptic feedback, etc.). Host processor 244 can also receive outputs (touch input) from touch screen 248 (or a touch controller, not-shown). The touch screen input can be used by computer programs stored in program storage 246 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Touch and/or gesture inputs from transducer arrays 230 can additionally be used by the computer programs to perform some or all of the actions described herein.

Host processor 244 can also perform additional functions that may not be related to touch processing and display.

Note that one or more of the functions described herein, including the processing of touch, gestures, and physiological signals, can be performed by firmware stored in memory (e.g., in DSP 242) and executed by one or more processors (in DSP 242), or stored in program storage 246 and executed by host processor 244. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system 238 is not limited to the components and configuration of FIG. 2, but can include other or additional components (or omit components) in multiple configurations according to various examples. In some examples, bottom electrode 306 and top electrode 310 can be driven differentially. For example, an analog-to-digital converter (ADC) may be added between transducer arrays 230 and DSP 242 to convert the signals to the digital domain, or touchscreen 248 can be omitted and signals or other information from the analysis and processing can be relayed to another device (e.g., a tablet, laptop, smartphone, computer, server, etc.) via wired or wireless connection that can include a display or other feedback mechanism for outputting a visual representation of the data or other notifications or information. Additionally, the components of computing system 238 can be included within a single device, or can be distributed between multiple devices.

Figure 3A:
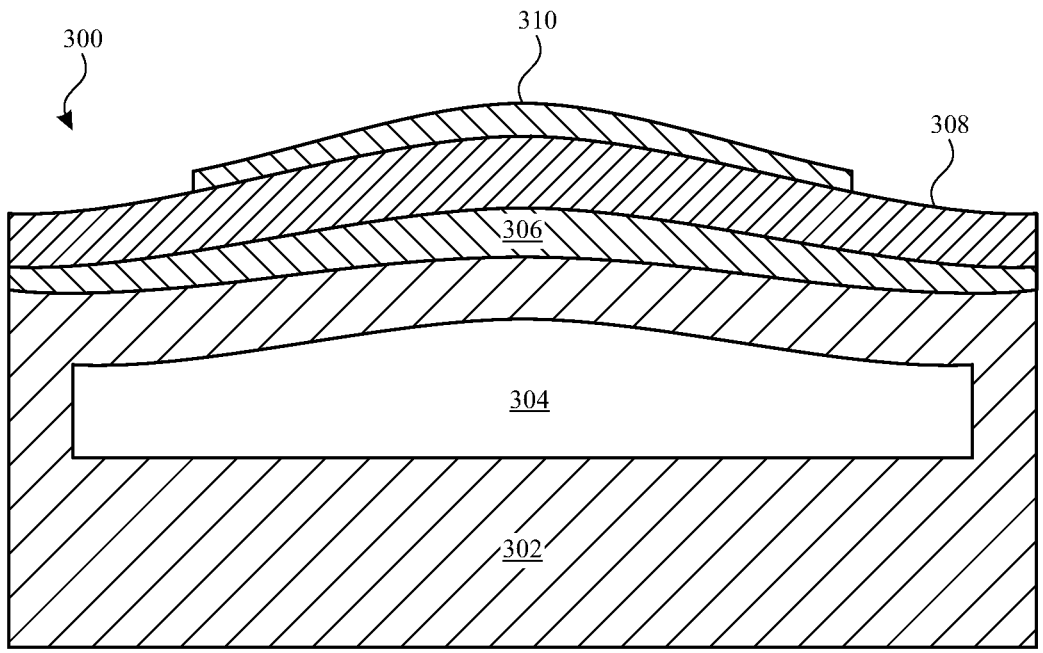
FIG. 3A illustrates an example cross-section of a device according to examples of the disclosure.

FIG. 3A illustrates an example cross-section of a device according to examples of the disclosure. In some examples, device 300 can be a micro-machined ultrasonic transducer (MUT) comprising a base material, electrodes, and piezoelectric materials. Device 300 can include base material 302, which can include one or more materials including, but not limited to silicon, stainless steel, rubber, or any other suitable material to fabricate a flexible printed circuit board. Base material 302 can be fabricated with a cavity 304, the cavity configured to support vibration of elements of device 300. The base material can additionally be configured in part as a mechanical support for other components of device 300. For example, device 300 can be configured as an ultrasonic transducer comprising bottom electrode 306 and top electrode 310. The electrodes can comprise one or more materials (e.g., platinum, aluminum, molybdenum) suitable to conduct a signal. Piezoelectric material 308 can be disposed between bottom electrode 306 and top electrode 310. In some examples, device 300 can be configured to receive one or more acoustic waves. For example, an electrical potential can be generated across piezoelectric material 308 in response to deformation of the piezoelectric material, which can couple to the electrodes. In some examples, device 300 can be configured to transmit one or more acoustic waves by applying a signal to the piezoelectric material via the electrodes; In response to the applied signal, the piezoelectric material can change shape. Piezoelectric materials can comprise one or more of polyvinylidene fluoride, aluminum nitride, scandium aluminum nitride, lead zirconate titanate, potassium sodium niobate, lead magnesium niobate-lead titanate. The depth of cavity 304 can be fabricated to support deformation of piezoelectric material 308 (and the accompanying deformation of electrodes 306 and 310). In some examples, cavity 304 can be fabricated with a target pressure (e.g., vacuum and/or low pressure). In some examples, the cavity pressure can be configured based on the characteristics of waves expected to excite and/or deform piezoelectric material 308.

In some examples, device 300 can be configured to emit ultrasonic waves. Bottom electrode 306 can be connected to a reference voltage and top electrode can receive one or more signals (e.g., a pulsed sinusoidal signal, a modulated continuous wave). Additionally or alternatively, bottom electrode 306 and top electrode 310 can be driven differentially. Piezoelectric material 308 in the presence of the voltage across electrodes 306 and 310 can deform in response. The deformation can then cause one or more pressure waves to be produced, thus converting the electrical energy applied via the electrodes to acoustic energy propagating away from device 300. In some examples, the wave frequency can depend on the excitation of the electrodes and be configured with specific applications in mind. For example, in airborne applications such as gesture sensing, the ultrasonic waves can be in a frequency range of 100 kHz to 300 kHz. In on-surface applications with fine imaging requirements, the frequency can be in the range of 10-20 MHz or higher. For haptics actuation, the frequencies can be in between these ranges. However, it should be understood that all of these frequency ranges are examples, and can be dependent on band material and other considerations. Additionally or alternatively, device 300 can be configured to receive incoming acoustic waves. For example, pressure waves incident upon device 300 can deform the piezoelectric material. In response to the deformation, the piezoelectric material can induce a charge between electrodes 306 and 310, which can be detected and converted to a signal.

Figure 3B:
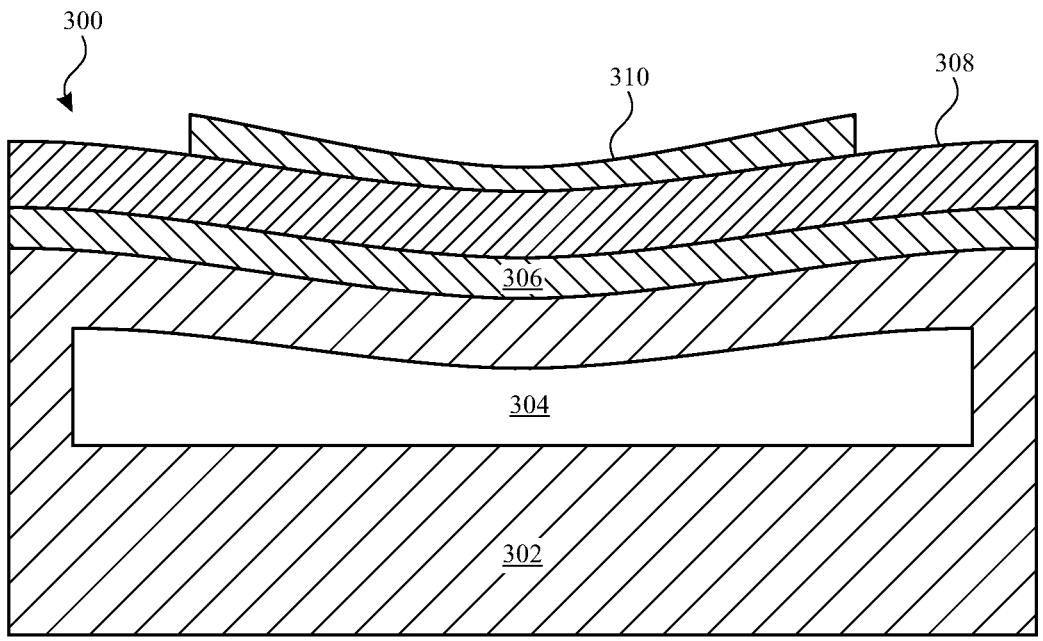
FIG. 3B illustrates an example cross section of a device according to examples of the disclosure.

FIG. 3B illustrates an example cross section of a device according to examples of the disclosure. Specifically, FIG. 3B illustrates an example of pressure induced on device 300. One or more ultrasonic waves incident upon device 300 can deform piezoelectric material 308. As described previously, an electrical potential can therefore be produced between electrodes 306 and 310. In some examples, the voltage can be connected to signal conditioning circuitry (e.g., filters, amplifiers, passive components, analog-to-digital converters, etc.) for further processing. In some examples, the wave incident upon device 300 can be transmitted from an exterior source, such as a second device, or the device environment. In some examples, the incident wave can be an "echo" of a wave emitted by device 300. For example, in a first time period, the device can emit a wave as shown in FIG. 3A. The wave can propagate outwards, bounce off a surface, propagate back towards device 300, and deform the layers of the device 300 (as shown in FIG. 3B). In some examples, the amplitude and/or the phase of the received signal can indicate the location and/or materials of nearby one or more objects. In some examples, device 300 can be one of a plurality of devices.

Figure 4A:
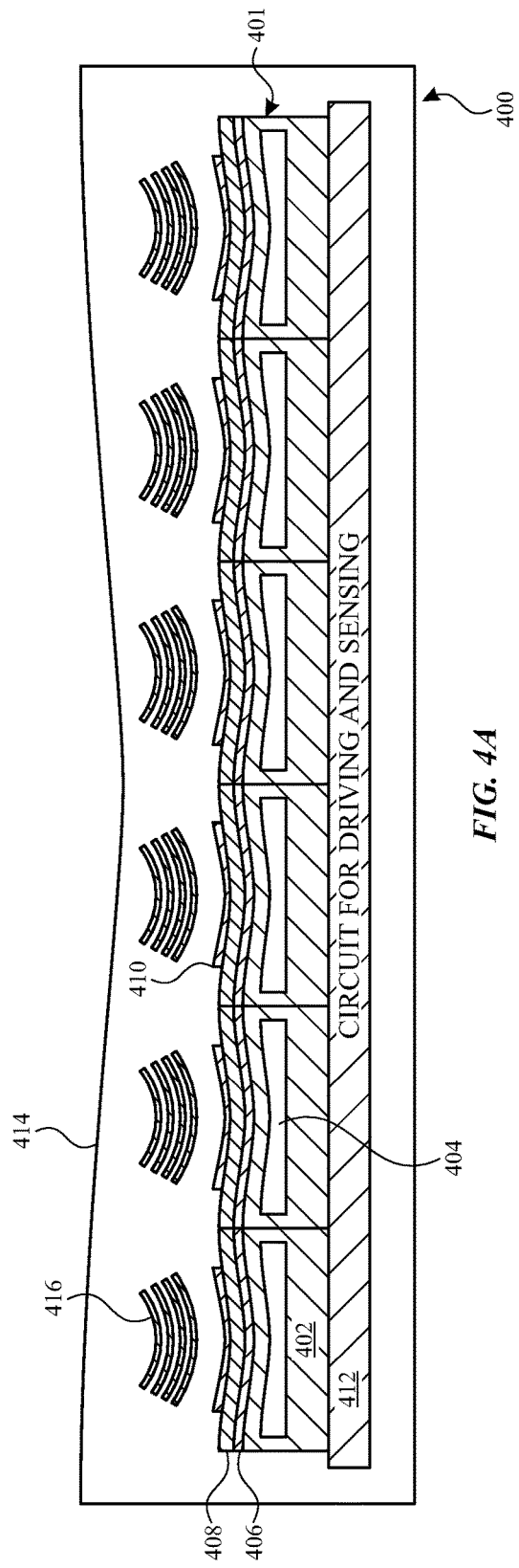
FIGS. 4A-4B illustrate a plurality of devices configured to transmit and/or receive signals in differing configurations according to examples of the disclosure.
Figure 4B:
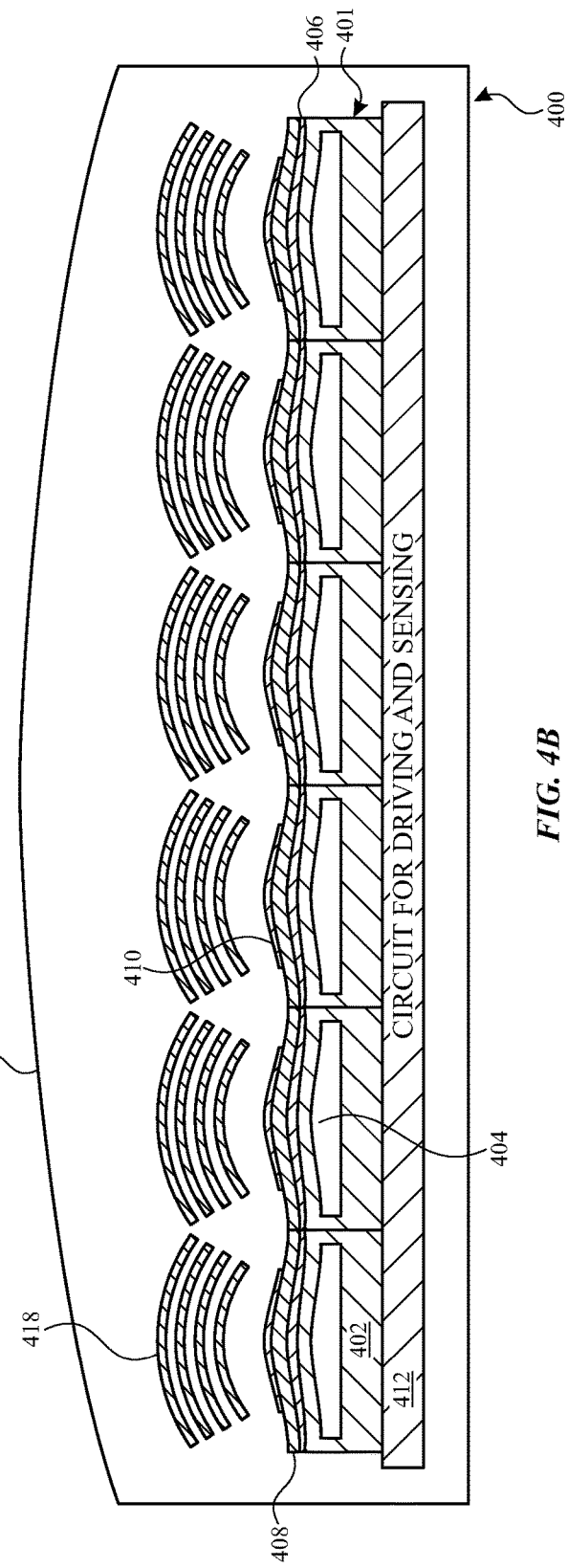

FIGS. 4A and 4B illustrate a plurality of devices configured to transmit and/or receive signals in differing configurations according to examples of the disclosure. In some examples, device 400 can comprise a plurality of devices (e.g., corresponding to device 300) arranged in an array. The respective devices can be MUTs. For example, FIG. 4A shows plurality of MUTs 401, each comprising a cavity 404 and a respective electrode of top electrodes 410. In some examples, the device can comprise a bottom electrode 406. Although not shown, bottom electrode 406 can instead be configured as a plurality of separate electrodes, each corresponding to a respective top electrode of top electrodes 410. As described with respect to FIGS. 3A-3B, device 400 can comprise a layer of piezoelectric material (e.g. one or more films) coupled to the electrodes. In some examples, device 400 can include multiplexing circuitry 412 configured to drive and sense the plurality of MUTs 401. Multiplexing circuitry 412 can be coupled to base material 402 and coupled to top electrodes 410 and/or bottom electrode 406. In some examples, multiplexing circuitry 412 can be embedded in band 414. Multiplexing circuitry 412 can, in some examples, include CMOS circuitry (e.g., switches, one or more multiplexers, inverters). In other examples, multiplexing circuitry 412 can include one or more thin-film transistors, carbon nanotube field-effect transistors, and/or any other appropriate technology to facilitate the required multiplexing and/or power delivery functions. In some examples, base material 402 can be formed from the same material, or as part of band 414. In some examples, base material 402 can be formed from different materials than from band 414. MUTs 401 can also include respective cavities 404. In some examples, multiplexing circuitry 412 can be highly configurable, and can provide a plurality of switching elements and control circuitry to multiplex one or more signals and selectively stimulate one or more electrodes of device 400. Multiplexing circuitry 412 can be coupled to elements that can provide power to the transducers. For example, a power source (e.g., a battery not shown) can be embedded within the band 414 and coupled to multiplexing circuitry 412. Additionally or alternatively, device 400 can be coupled to additional circuitry (e.g., a watch comprising with processing circuitry) via multiplexing circuitry 412 to provide power and/or control of MUTs 401.

In some examples, arranging the plurality of MUTs 401 in an array can improve the signal-to-noise ratio received by device 400 (e.g., by aggregating the outputs of devices). Moreover, in some examples, interference between respective signals from a MUT array can increase the amplitude of signals. For example device 400 can comprise a band 414, which can comprise to one or more materials selected to facilitate the propagation of signals (e.g., ultrasonic signals through and/or across the material). In some examples, device 400 can be a wearable device such as a watch, and band 414 can be a band material coupled to the watch and configured to wrap around a wrist of a user. Accordingly, the material of band 414 can be selected for user comfort while wearing the device.

In some examples, device 400 can be configured to propagate outgoing and receive incoming pressure waves. For example, one or more ultrasonic waves 416 can be produced by and propagate towards MUTs 401. Ultrasonic waves 416 can be configured to propagate towards an object in contact with band 414 (e.g., a finger). A respective wave of ultrasonic waves can collide with the object, and cause a reflected wave to propagate back towards MUTs 401. MUTs 401 can receive the one or more reflected waves, causing deformation of piezoelectric layer 408. In some examples, the deformed piezoelectric layer 408 can have a difference in electrical potential across its surfaces which can couple to top electrodes 410 and bottom electrode 406. Multiplexing circuitry 412 coupled to MUTs 401 can receive, process, and/or pass the one or more voltages. Specifically, the amplitude and/or phase of the received signals can be processed and provide information about the object, such as the distance to the object from a respective MUT. Device 400 can operate in a flexure mode, wherein voltage waves are applied in a first direction (e.g., vertically relative to FIG. 4A) and the compressive stress induced on the piezoelectric materials is perpendicular, or nearly perpendicular to the first direction. In some examples, aspects of the device including geometries (e.g., thickness, width, length), material properties, arrangement, and/or number of devices of MUTs 401 can vary to support such applications. In some examples, the device can also be configured to map surfaces (e.g. the ridges and/or valleys of a fingerprint), recognize the positions of proximal objects, and/or recognize movement and gestures of the proximal objects.

FIG. 4B illustrates a plurality of devices configured to transmit and/or receive signals according to examples of the disclosure. Specifically, FIG. 4B shows a complementary representation of the device 400 shown in FIG. 4A, wherein MUTs 401 are configured to transmit ultrasonic waves 418.

Figure 5:
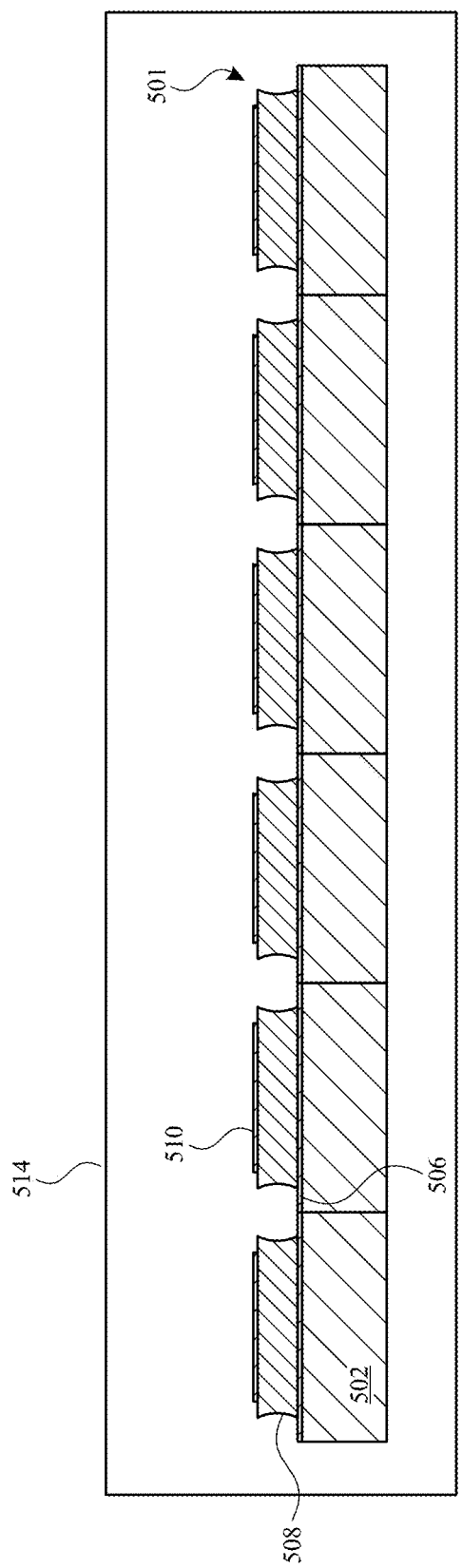
FIG. 5 illustrates an example device configuration according to examples of the disclosure.

FIG. 5 illustrates an example device configuration according to examples of the disclosure. In some examples, MUTs 501 can comprise a plurality of bulk elements (e.g., bulk ultrasonic transducers). Device 500 can comprise a plurality of top electrodes 510 and a bottom electrode 506. As described previously, it is understood that the bottom electrode 506 can comprise a plurality of separated electrodes, for example each respective bottom electrode having a corresponding top electrode. Piezoelectric layer 508 can be disposed between a top electrode and a bottom electrode of a respective MUT of MUTs 501, and in some examples, bottom electrode 506 can be connected to a first voltage (e.g., to ground), and one or more signals pulses (e.g., sine wave) can be applied to top electrode 510. Additionally or alternatively, a continuous wave signal can be applied to top electrode 510. Additionally or alternatively, bottom electrode 306 and top electrode 310 can be driven differentially. In response to the applied signal, piezoelectric layer 508 can deform (specifically, increasing and/or decreasing in thickness), thus creating one or more ultrasonic waves in response. Unlike the embodiment shown in FIGS. 4A-4B, device 500 be configured as a thickness mode transducer, wherein a voltage signal and stress induced on the piezoelectric material both travel along the same axis (e.g., vertically with respect to FIG. 5).

Further embodiments described herein refer generically to transducer arrays, but specifically can refer to the micromachined ultrasonic transducers described with respect to FIGS. 4A-5. In some examples, the embodiments shown in FIGS. 4A-4B can improve directivity of signals. Signal directivity can be an important consideration when a position (relative to the transducer array) of a target and/or source of ultrasonic waves is known. Specifically, when a target object is expected to be located in proximity to a first side of a housing, such as a watch band, the transducer array can be configured to improve device electro-acoustic efficiency (i.e., electrical power of a signal that is converted to acoustic power of a transmitted/received wave) and power consumption when transmitting waves toward and receiving waves from the first side. For example, the transducer array can be configured to transmit ultrasonic waves such that haptic feedback can be felt by a user of device 400; the transducers can provide a relatively stronger sensation of haptic feedback because the ultrasonic waves are more efficiently focused on transmission towards the user and not away from the user. In some examples, fabricating a cavity with low pressure (e.g., a vacuum) underneath the electrodes of a piezoelectric transducer can create an acoustic interface between the electrodes/piezoelectric material and the cavity (an acoustic impedance mismatch) that causes a significant amount of reflected of acoustic energy traveling in an undesired direction (towards the cavity). Specifically, differences in respective densities of the cavity and the electrodes/piezoelectric material can cause corresponding differences in acoustic impedance. Accordingly, undesirable reflections (echoes) from acoustic energy traveling in an unintended direction (e.g., transmitted by the piezoelectric transducer and traveling towards the cavity or traveling from underneath the cavity towards the transducer) can be reduced. For example, the cavity can be held at a vacuum, or near vacuum amount of pressure, thus having a low acoustic impedance. The energy of an acoustic wave (e.g., generated by the electrodes and piezoelectric material) can be reflected at the acoustic boundary with the acoustic impedance mismatch. In some examples, the acoustic waves propagating generated by the electrodes and piezoelectric material and propagating away from the cavity can constructively interfere with the acoustic waves reflected by the acoustic boundary, thus focusing the net transmission of acoustic energy away from the cavity. For example, for fingerprint sensing, MUTs 401 can transmit acoustic waves generated by the electrodes and piezoelectric materials propagating towards the top surface of the band (e.g., away from the cavity and multiplexing circuitry 412) with a high electro-acoustic efficiency. Similarly, MUTs 401 can receive acoustic waves traveling from the top surface of the band with a higher electro-acoustic efficiency than acoustic waves propagating from the bottom of band 414. In another example, for blood vessel sensing, MUTs 401 can be located closer to the user's skin (on the inner side of the band) and the cavities can be located farther from the user's skin (on the outer side of the band) so that the acoustic waves can be focused toward the user to achieve a better signal to noise ratio.

As described previously, band 414 can be a wearable band comprising a plurality of one or more devices (such as device 400). In some examples, device 400 can be configured to detect the temperature of a user wearing the wearable band. For example, cavity 404 can be used to detect changes in the user's temperature based on changes to resonant characteristics of device 400 (e.g., acoustic impedance, pressure in cavity 404, and/or the resonant frequency of device 400). In some examples, to establish a temperature measurement, a calibration process can first be performed to establish a baseline of one or more devices represented by device 400, for example. Using the calibration results, resonant characteristics can be calculated and stored (e.g., by a processor coupled to the one or more devices—not shown). By comparing the calibration information against the measured information, user temperature can be extracted.

In some examples, the device configuration shown in FIG. 5 can improve signal transmission and reception from both sides of the transducer array. Specifically, unlike the embodiment shown in FIGS. 4A-4B, waves propagating towards either a first (e.g., top) or a second (e.g., bottom) side of band 514 can be generated, propagate, and be received with similar efficiencies. Thus, stimulating respective electrodes of device 500 can create acoustic waves that efficiently propagate on both sides of the device.

Figure 6:
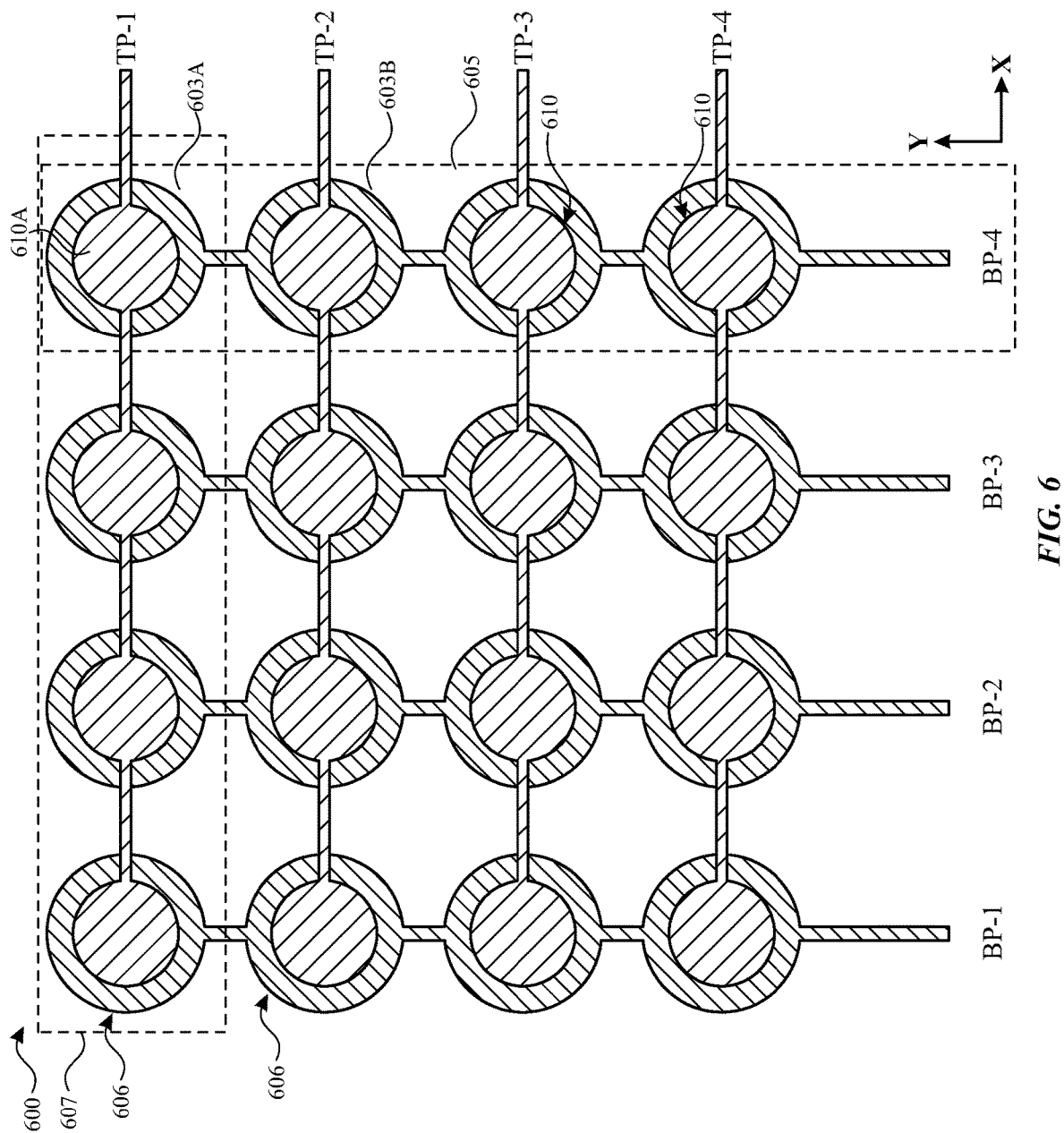
FIG. 6 illustrates an example transducer configuration according to examples of the disclosure.

FIG. 6 illustrates an example transducer configuration according to examples of the disclosure. In some examples, transducer array 600 can comprise a plurality of top electrodes 610. Transducer array 600 can further comprise a plurality of bottom electrodes 606. As described with respect to other embodiments, the top electrodes 610 can receive a stimulus and the bottom electrodes 606 can be connected to a reference voltage (e.g., ground). Alternatively, bottom electrode 306 and top electrode 310 can be sensed differentially. In some examples, the transducer array 600 can be arranged as with top electrodes 610 connected in a plurality of rows and bottom electrodes 606 connected in a plurality of columns. A first row TP-1 comprises a plurality of electrically connected respective top electrodes 610. For example, transducer 603A is connected to adjacent electrodes; therefore the entire top electrode row (TP-1) 607 can be driven with the same stimulus signal. This configuration can be repeated throughout transducer array 600, partially or entirely. Similarly, in some examples, a first column BP-4 605 can comprise a plurality of electrically connected respective bottom electrodes 606. It is understood that description of transducer array 600 is merely exemplary, and not in any way limited. For example, one or more top and/or bottom electrodes of a given row or column can be disconnected to an adjacent electrode, and connected to one or more other electrodes in its respective row or column. Additionally or alternatively, a first portion of the one or more electrodes of a respective row and/or column can be connected to a first stimulus, whereas a second portion can be connected to a second stimulus. Additionally or alternatively, the arrangement of rows and columns can vary in pattern (e.g., rows and columns at some non-perpendicular angle to each other).

In some examples, the transducer array 600 can be selectively configured to transmit and/or receive beamform one or more signals. Beamforming can refer to configuring a plurality of devices to alter the radiation pattern (i.e., direction and concentration of transmitted signals) of the devices by controlling the amplitude, phase, and delay of the constituent devices. In some examples, an ultrasonic transducer array can implement a similar concept—an aggregate, strong signal can be directed towards a variable target location by varying amplitudes and/or phase driving respective transducers of the array. In this way, the interference pattern of ultrasonic waves emitted by the respective transducers can be configured to transmit stronger and more precisely located signals, when compared to a signal transmitted by a single transducer.

As described previously, the electrodes of transducer array 600 can be coupled to one or more piezoelectric elements, thus providing a means for transmitting and/or receiving signals. In some examples, the amplitude, frequency, and/or associated phase delay applied to the electrodes (e.g., top electrodes 610) can be varied by control and stimulation circuitry (not shown). Additionally or alternatively, particular rows and/or columns of the transducer array 600 can configured to drive respective transducers by connecting and disconnecting an applied voltage (e.g., stimulation signals, reference voltages, and/or electrical ground). For example, transducer 603A can be driven by connecting the top electrode row TP-1 607 while the remaining rows of top electrode are disconnected, or otherwise terminated. At the same time, the bottom electrode column BP4 605 can be connected (e.g., to ground). The overlapping portions of top electrode row TP-1 607 and bottom electrode column BP-4 605 can form an individually addressable stimulus that drives transducer 603A. For example, a voltage is applied to piezoelectric material (not shown) between the respective top and bottom electrodes of transducer 603A. On the other hand, the voltage between respective electrodes of transducer 603B (or any other electrode not subject to a stimulus at its respective top electrode and/or not grounded) can be insufficient to produce and/or receive ultrasonic waves. In some examples, this concept can be extended to selectively drive and/or sequence one or more transducers of transducer array 600. In some examples, a plurality of rows and/or columns can be driven. For example, all the rows forming the top electrodes can be driven and one or more columns can be selectively connected (e.g., to ground). It is understood that the drive configurations described thus far are merely exemplary and not limiting in any way. For example, the bottom electrodes can be configured to receive a stimulus, and the top electrodes can be connected to ground.

In some examples, an aggregate signal can be directed towards a target of one or more locations by selectively driving one or more transducers. For example, particular transducers can be driven at an instant in time. The transducer stimulus can be optionally controlled (e.g., varying the amplitude and/or phase content of the stimulus), thereby controlling the amplitude and/or phase of generated ultrasonic waves.

For example, transducers array 600 can be driven such that the pattern of interfering (e.g., constructively and/or destructively) signals from respective transducers results in an aggregate signal having a precise path of propagation. The time of flight of a wave from each individual transducer to an object can be unique, and control circuitry can drive and/or disconnect signals and vary stimulation characteristics to ensure the waves produced by transducer array 600 conform to a desired interference pattern. The interference pattern can result in an effectively strong signal that can be precisely directed to particular regions of interest.

In some examples, a pressure wave sweep can be performed by sequentially applying drive to transducer array 600 (e.g., along the direction of a column and/or along the direction of a row). For example, during a first time period, a row of top electrodes TP-1 607 can be connected to ground (e.g., instead of stimulus) and stimulate a first column of electrodes. In a succeeding time period, the first column can be disconnected from stimulus. After a time delay (e.g., associated with a desired beamforming pattern), a second column can be connected to stimulus. In some examples, this sequence can be repeated between a portion and/or all rows and columns of transducer array 600. In some examples, a plurality of columns and/or rows can be stimulated simultaneously, or nearly simultaneously, to transmit a pressure wave over a broad area. The net effect can be a wave of ultrasonic signals that travels in the x-direction (related to the axes established in FIG. 6). Additionally or alternatively, the sequence can include a pressure wave in the y-direction by sequentially driving a row of top transducers while maintaining a connection (e.g., to ground) to the bottom electrodes.

In some examples, receive beamforming can include selectively configuring one or more elements of transducer array 600 and/or circuitry associated with the one or more elements to alter characteristics of the received one or more waves. Although not shown, additional circuitry can be used to alter the amplitude and/or phase of signals received by transducer array 600. Additionally or alternatively, the signals can be digitized (after optionally undergoing signal conditioning), and appropriate weights and/or delays can be introduced to the received one or more signals for a digital approach to receive beamforming.

In some examples, one or more rows and/or columns of transducer array 600 can be disposed in a band and electrically coupled to a pin of a host device. In some examples, the host device can be a smartwatch including processing and control circuitry. The host device can include housing comprising a bezel, wherein one or more ports and/or pins are embedded within the bezel. The host device can be mechanically and electrically coupled to a band, wherein the band is configured to attach the host device to the body (e.g., the wrist) of a user. In some examples, the host device can include a display, and the pins can be arranged in a bezel region that is not visible when viewing the display. The pins can couple to the band via traces of a flexible printed circuit board embedded within/on the band material. The traces of a flexible printed circuit board can couple to, for example, the power and control circuitry associated with transducer array 600. As described previously—but not shown—the transducer array 600 can be coupled to circuitry to power and control signals applied to the array. In this way, signals provided via pins of the host device can selectively drive and/or configure the transducer array. Additionally or alternatively, the pins and associated connections (e.g., traces, power and control circuitry) can be configured as sensing circuitry to detect and process signals incident upon transducer array 600.

In some examples, one or more signals can be transmitted from a column and/or row to a different column or row on an opposing end of transducer array 600. As described previously, resonant characteristics of transducer array 600 can change in response to temperature (e.g., of a user). As a result, the propagation time of a signal traveling from the column and/or to the opposing end of transducer array 600 can change. In some examples, the change in propagation time and/or the associated time of flight can be used (e.g., by an associated processor) to indicate temperature of the user or the environment. In some examples, a change in acoustic impedance of one or more respective cavities of transducer array 600 can be used to indicate temperature of the user or the environment.

Figure 7:
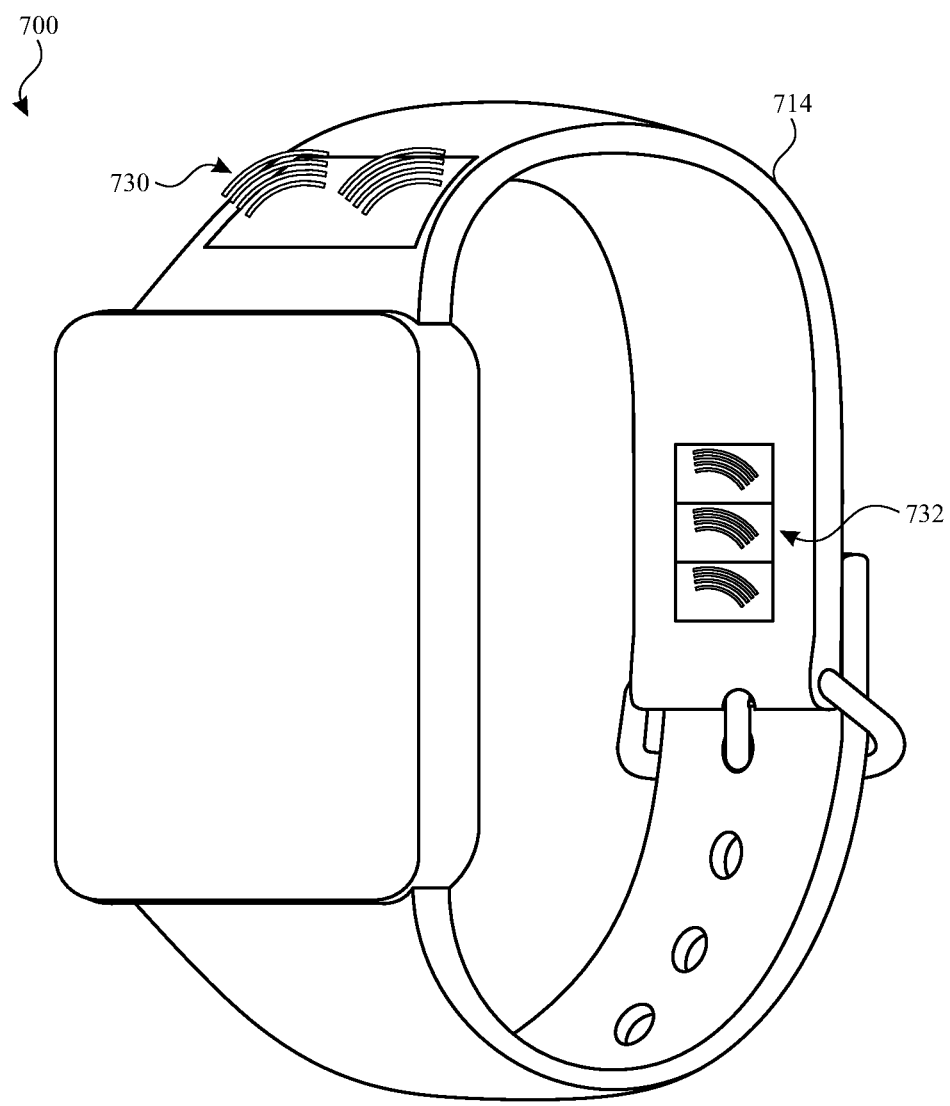
FIG. 7 illustrates an example device comprising micro-machined transducers according to examples of the disclosure.

FIG. 7 illustrates an example device comprising micromachined transducers according to examples of the disclosure. Device 700 can be a smartwatch device including a touch and/or display circuitry, processing circuitry, and mechanical and/or electrical interconnects. Device 700 comprises a band 714, which as described with respect to FIGS. 4-6, can include transducers coupled to power and control circuitry of the smartwatch device. Band 714 can wrap around the body (e.g., the wrist) of a user, thus defining an exterior surface that does not contact the user on a first side of the band and an interior surface that is in contact with the user on an opposite, second side of the band. Band 714 comprises a plurality of transducer arrays, for example array 730, configured to transmit one or more waves (e.g., ultrasonic waves) away from the user, and to receive waves propagating towards the exterior of the band. Additionally or alternatively, array 732 can be configured to transmit one or more waves (e.g., ultrasonic waves) from the interior surface of the band towards the user, and to receive waves propagating from the user and towards the interior of the band. In some examples, the arrays can be configured conversely, that is to say array 730 can transmit waves towards the body (e.g., wrist) of the user and receive waves originating from the interior of band 714; array 732 can also be configured to transmit waves towards—and receive waves from—the exterior of band 714. In some examples, waves incident upon either surface of the band can be detected by array 730 and/or array 732.

In some examples, device 700 can include fewer or greater numbers of arrays than shown in FIG. 7. Array locations and geometries can also vary (e.g., depth, orientation, area, number of devices, arrangement of constituent transducer devices, length, width, pattern). In some examples, the respective arrays can be driven in a sequence. For example, a subset of all transducer arrays within band 714 can be driven at different time periods. Arrays that are not actively driven (and potentially, circuitry associated with the non-active arrays) can be configured in a low-power mode of operation to save power.

In some examples, transducer arrays of device 700 can be configured with particular use cases in mind. For example, an exemplary device (e.g., device 700) can be configured to monitor blood pressure in real time. In some examples an exemplary device can be configured to monitor the dimensions of one or more blood vessels. In some examples an exemplary device can be configured to recognize one or more fingerprints of a user of the device. In some examples an exemplary device having a watch band can be configured to detect touch and/or gestures on the surface of the band. In some examples an exemplary device can be configured to detect the location and movement of objects proximal to the device, including the hand of a user. In some examples an exemplary device can be configured to perform near-field data communications with a second device. In some examples an exemplary device can be configured to monitor the interaction and distance between the device and a second device.

In some examples, the one or more signals received by transducer arrays embedded within a watch band can be used to supplement can be used to supplement user interaction with a device (e.g., a smartwatch device with a touch sensitive display). For example, the signals can be used as indications of user input (scrolling, selecting, unlocking, varying display and/or acoustic characteristics, toggling operational modes, etc.) associated with the device.

Figure 8A:
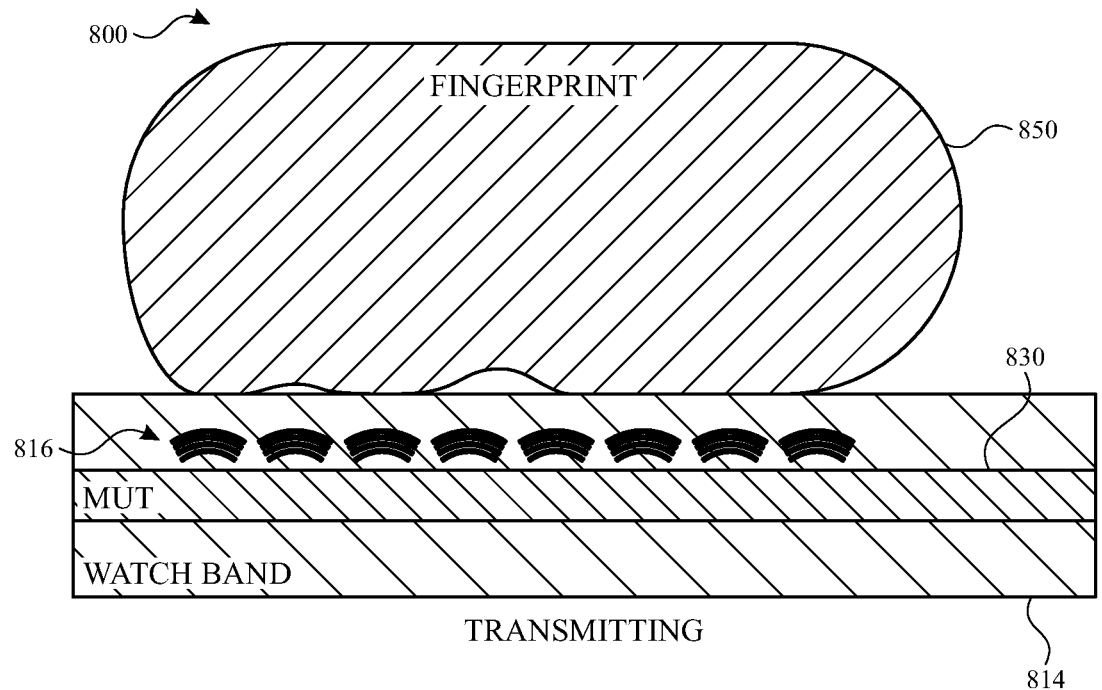
FIGS. 8A-8B illustrate an example device configured to detect features of a user according to examples of the disclosure.
Figure 8B:
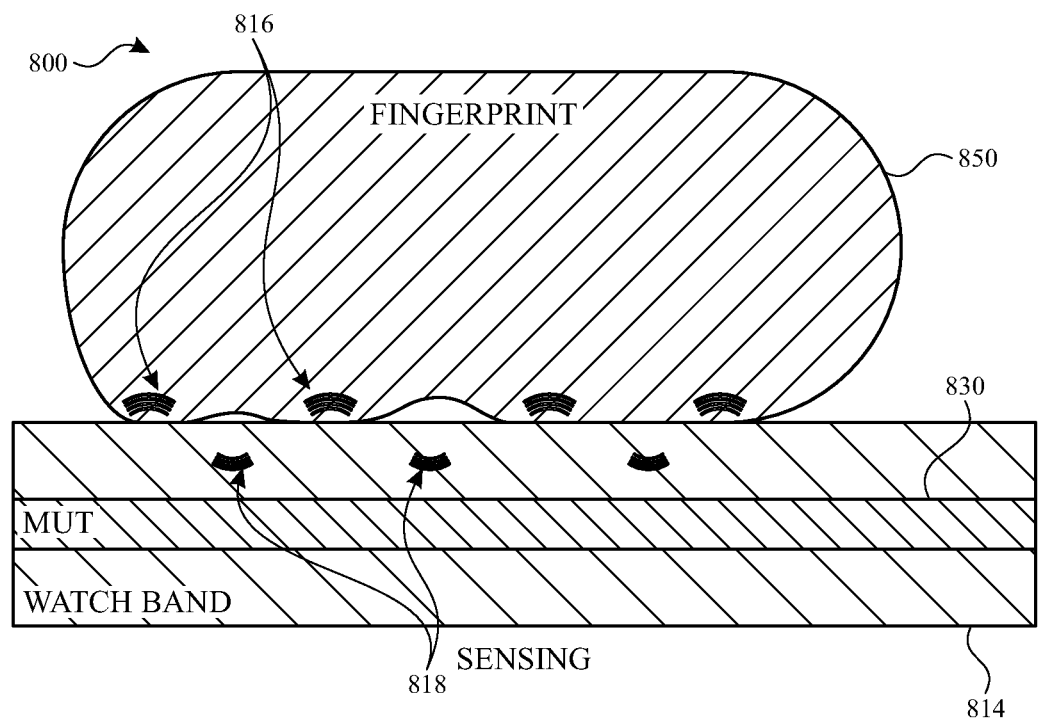

FIGS. 8A and 8B illustrate an example device configured to detect features of a user according to examples of the disclosure. As described previously, MUT arrays can be configured to transmit ultrasonic waves. When the waves "echo" off a surface, reflected ultrasonic waves can be received by the MUT arrays and further processed—this concept can be applied to detect a fingerprint of a user.

Finger 850 of a user can contact a band 814 on a surface of the band. A MUT array 830 can be disposed within the band material and configured to transmit ultrasonic waves 816 towards the band surface. In some examples, finger 850 can partially deform band 814, thus inducing stress on a piezoelectric material of the MUT array (not shown) and inducing a voltage on electrodes (not shown) of MUT array 830. Naturally, the ridges and valleys of finger 850 can be positioned at varying distances from the MUT array 830 during contact. As shown in FIG. 8B, the ultrasonic waves 816 can (in part) continue propagating and/or be absorbed by finger 850, while some ultrasonic energy propagates back towards MUT array 830, thus creating one or more reflected waves 818. The received, reflected waves can be further processed and/or analyzed to generate an image of the topography of finger 850. For example, the amplitude and/or phase of received signals can indicate the distance between a ridge or valley of finger 850 and the MUT array. In some examples, the general idea of determining features of the finger can be extended to capture dynamic behavior, including changes in position of touch around the device.

Figure 9:
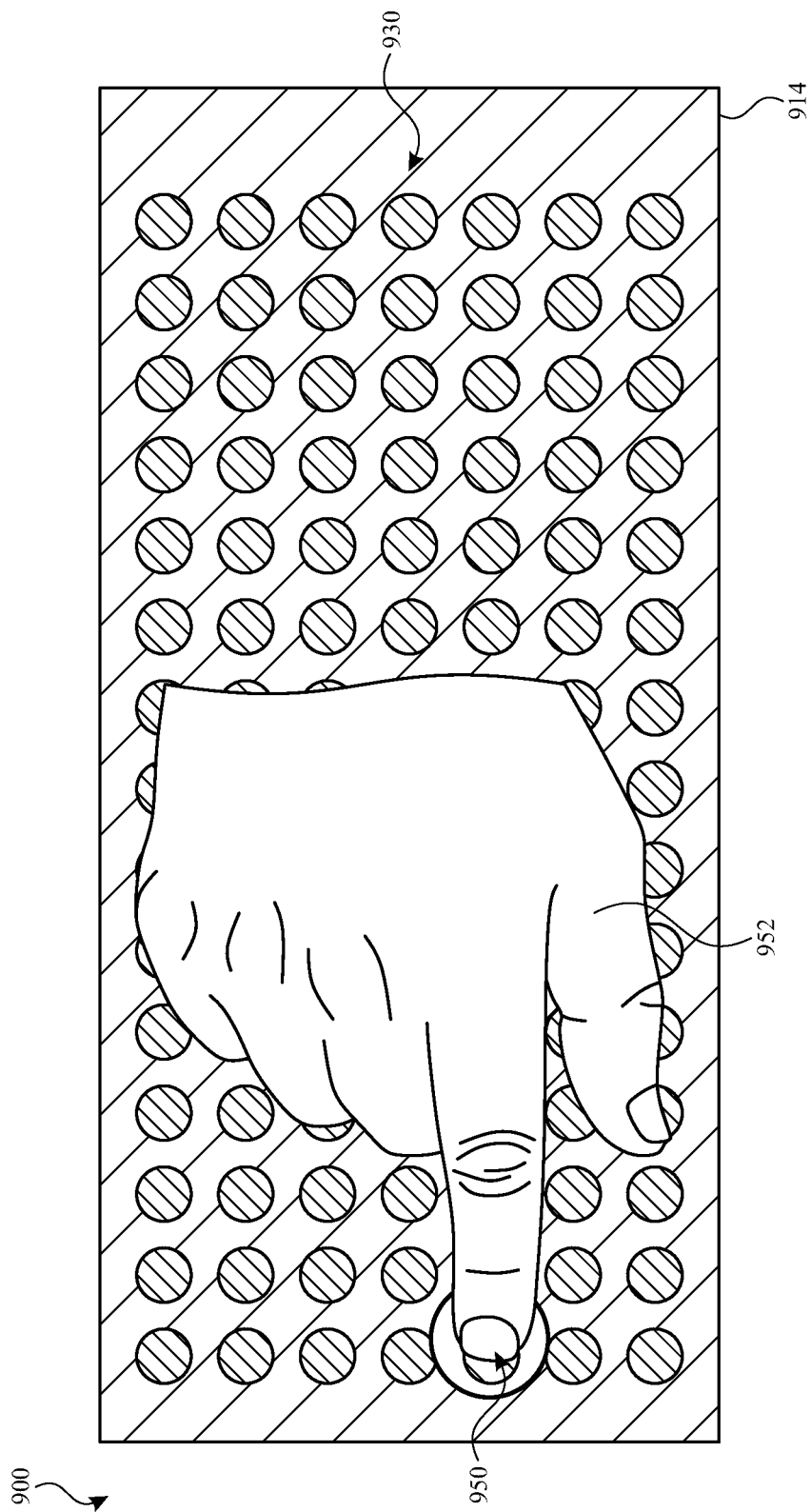
FIG. 9 illustrates an example device configured to detect touch according to examples of the disclosure.

FIG. 9 illustrates an example device configured to detect touch according to examples of the disclosure. In some examples, touch location and velocity can be detected and tracked by device 900. Device 900 can be a watch device that includes a band 914. As described previously with respect to FIG. 7, device 900 can include touch and display circuitry (not shown) and be coupled to band 914, wherein the band surface is separate from the touch and display surface. Band 914 can include a transducer array 930, which can comprise one or more piezoelectric transducers configured for ultrasonic touch detection. In some examples, transducer array 930 can vary in geometry, pattern, and drive stimulus (e.g., stimulation frequency, amplitude, phase) to optimize touch detection. In some examples, a finger 950 can contact the surface of band 914. In some examples transducer array 930 can be configured to transmit one or more signals towards hand 952 (which comprises finger 950).

For example, during a first time period, transducer array 930 can be configured to transmit ultrasonic waves over a broad region of band 914. Transmission can include a driven sequence including, but not limited to, sweeping the transducer drive along an axis (e.g., x-direction, y-direction, diagonally), driving a plurality of ultrasonic waves uniformly away from band 914, and/or any other appropriate sequence. In some examples, transducer array 930 can be configured to receive the echo of the transmitted waves (e.g., during a second time period). For example, the amplitude of a signal reflected by a ridge (e.g., a portion of a fingerprint in contact with the watch band) can be detected by transducer array 930. On the other hand, the amplitude of a second signal reflected by a valley (e.g., a portion of a fingerprint some distance away from the watch band) can be zero, or smaller than some threshold. Additionally or alternatively, transmitting and receiving ultrasonic waves can be performed simultaneously. The received, reflected waves can be processed and/or analyzed but processing circuitry (not shown), to provide an indication of objects in contact and/or in proximity to band 914. In some examples, characteristics of the finger (e.g., a fingerprint) can be assisted by processing and/or analyzing the objects in contact with band 914. In some examples, after determining particular features such as the touch location of finger 950, transducer array 930 can be configured to improve detection of a subset of the band surrounding the touch location (e.g., beamform the transducer waves, configure array for reverse beamforming). In some examples, the touch detection can be performed for a plurality of objects (e.g., fingers) in rapid sequence and/or simultaneously. In some examples, deformation of the band and/or distance between an object (e.g., a finger) and transducer array can be analyzed to detect a force of contact. In some examples, the transducer array can be configured to detect movement of touch location(s). For example, swiping gestures, sequences of taps, spatial relationships between one or more objects using a single finger, multiple finger, and/or some combination thereof can be detected. In some examples, the orientation of the one or more objects can be detected. For example, transducer array 930 can first image the one or more objects (e.g., detect a fingerprint). The image can be tracked to understand the orientation of the object with respect to the device touch and/or display circuitry and/or band 914. In some examples, the velocity (e.g., speed and direction of movement) of objects can additionally or alternatively be detected.

It is understood that the in some examples, one or more transducers arrays can additionally or alternatively be configured to detect user gestures that are optionally not in contact with the surface of the band relying upon similar concepts as described with respect to FIG. 9. Furthermore, it is understood that the transducer arrays can be configured to perform one or all of the sensor modalities described herein. A transducer array configured to perform touch sensing on a band of an example device can additionally be reconfigured to perform gesture detection as described herein. Additionally or alternatively, first one or more portions of a transducer array can be configured for a first sensing modality (e.g., touch and/or fingerprint sensing) and second one or more portions of the transducer array can be configured for a second sensing modality (e.g., gesture detection).

In some examples, aspects of individual one or more transducers within an example transducer array can be configured to improve performance of particular sensing modalities. For example, the size of one or more respective transducers can be varied to optimize resonant frequencies of the respective transducers. Optimizing resonant frequencies of transducers can improve the efficacy of transmitting and/or receiving signals via the transducers, thus improving the power of the signals transmitted and/or received and improving the overall signal-to-noise ratio of the device. A first, relatively smaller transducer can resonate at a relatively higher frequency, compared to a second, relatively larger transducer having a lower resonant frequency. Similarly, a first row of respective transducers of a transducer array can be a first size (e.g., a relatively smaller size configured to resonate at a higher frequency), and a second row of respective transducers can be a second size (e.g., a relatively larger size configured to resonate at a lower frequency). The first and second rows can be adjacent to each other, and further adjacent rows of transducers can repeat alternating pattern such that the transducer array comprises rows of transducers that alternate in size. Thus, the transducer array can perform high efficiency touch, fingerprint, and contactless gesture detection across the entire array surface.

Additionally or alternatively, the stimulus applied to an example transducer array can be configured to improve particular sensing modalities. For example, digital control circuitry associated with an example device can vary characteristics of the stimulus including, but not limited to, amplitude and phase of signals transmitted by the device.

Figure 10:
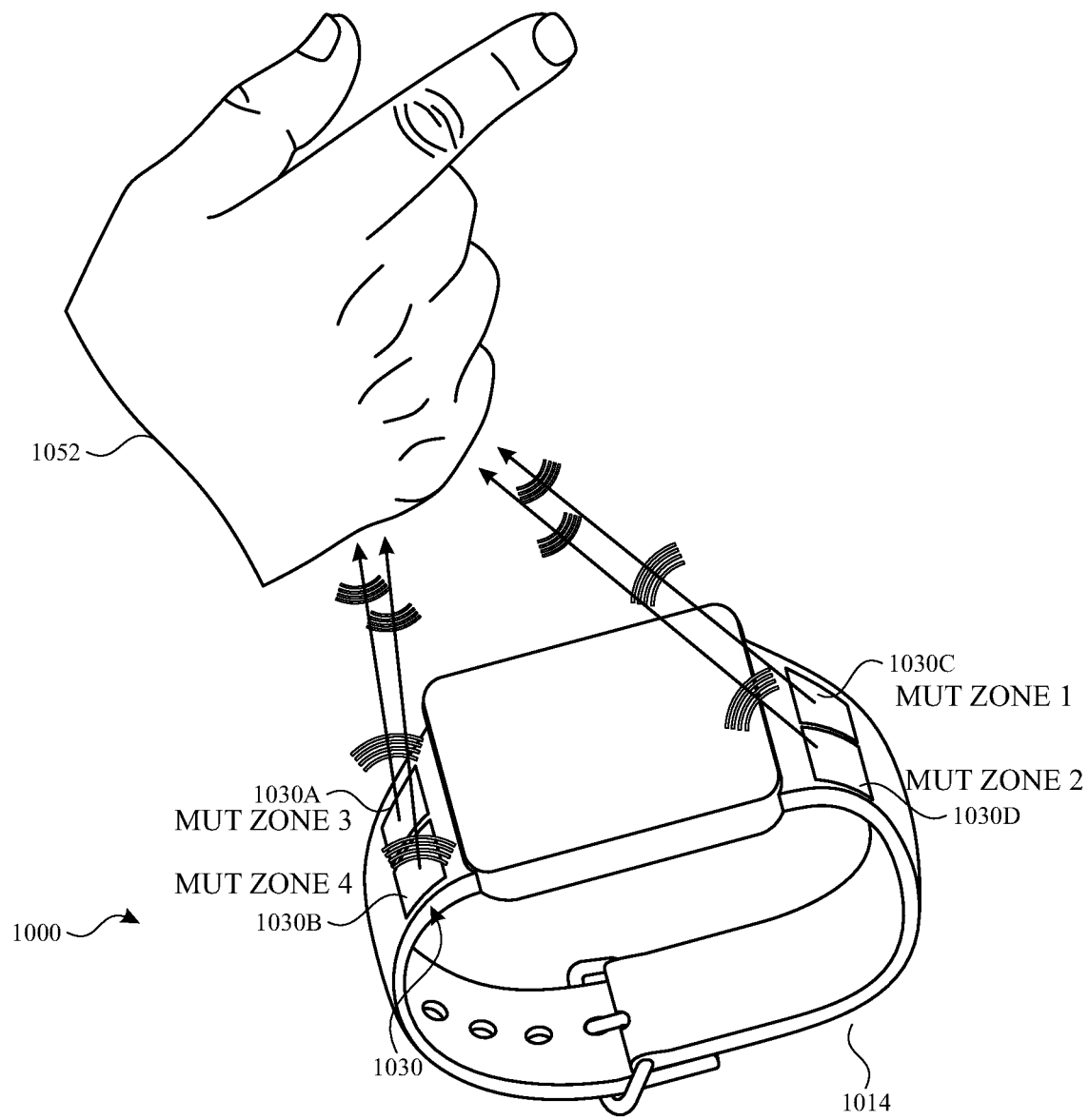
FIG. 10 illustrates an example device configured to detect gestures according to examples of the disclosure.

FIG. 10 illustrates an example device configured to detect gestures according to examples of the disclosure. In some examples, device 1000 can comprise a plurality of transducer arrays 1030 embedded within the band 1014. For example, four transducer arrays 1030A-D can comprise piezoelectric elements that can be stimulated to produce one or more ultrasonic waves. As described previously, transmitting the one or more ultrasonic waves can be directed broadly towards a region away from the surface of the watch band. In some examples, one or more waves that reflect off an object 1052 near device 1000 can propagate towards the plurality of transducer arrays 1030. In some examples, the one or more waves can be detected via the plurality of transducer arrays and be processed and/or analyzed by the processing circuitry. For example, the timing, amplitude, and/or phase of the received waves can be processed to indicate positions of features of the hand. Additionally or alternatively, the general position of the hand relative to the device and/or the band can be detected. After obtaining the general position of the hand, the plurality of transducers arrays can optionally be configured to beamform and/or receive beamform the waves transmitted and/or received by the plurality of transducers arrays. In some examples, the transmission, reception, and processing of ultrasonic waves can be repeated over time to detect changes in position of the hand. For example, the velocity (i.e., both speed and direction) of the hand can be detected. Additionally or alternatively, three or more transducer arrays (e.g., 1030A-C) can be configured to detect a three-dimensional map of the finger. The three or more transducer arrays can each be configured to detect the position from a respective transducer array a point on the hand. The detection can be repeated to calculate a plurality of positions of the hand, the plurality of positions further aggregated to create the spatial map of the object (e.g., relative to the device and/or band). In some examples, the frequency of the ultrasonic waves can fall within 10-20 kHz. It is understood, however, that the frequency of the ultrasonic waves can vary, provided the signals that are transmitted and/or received can provide sufficient indications of hand over time.

In some examples, a watch device coupled to a band can comprise transducer arrays configured to transmit towards and receive signals from the wrist of a user. For example, the watch device can be configured to detect physiological signals including blood pressure, heart-rate variability, and/or indications of blood vessel dimensions.

Figure 11:
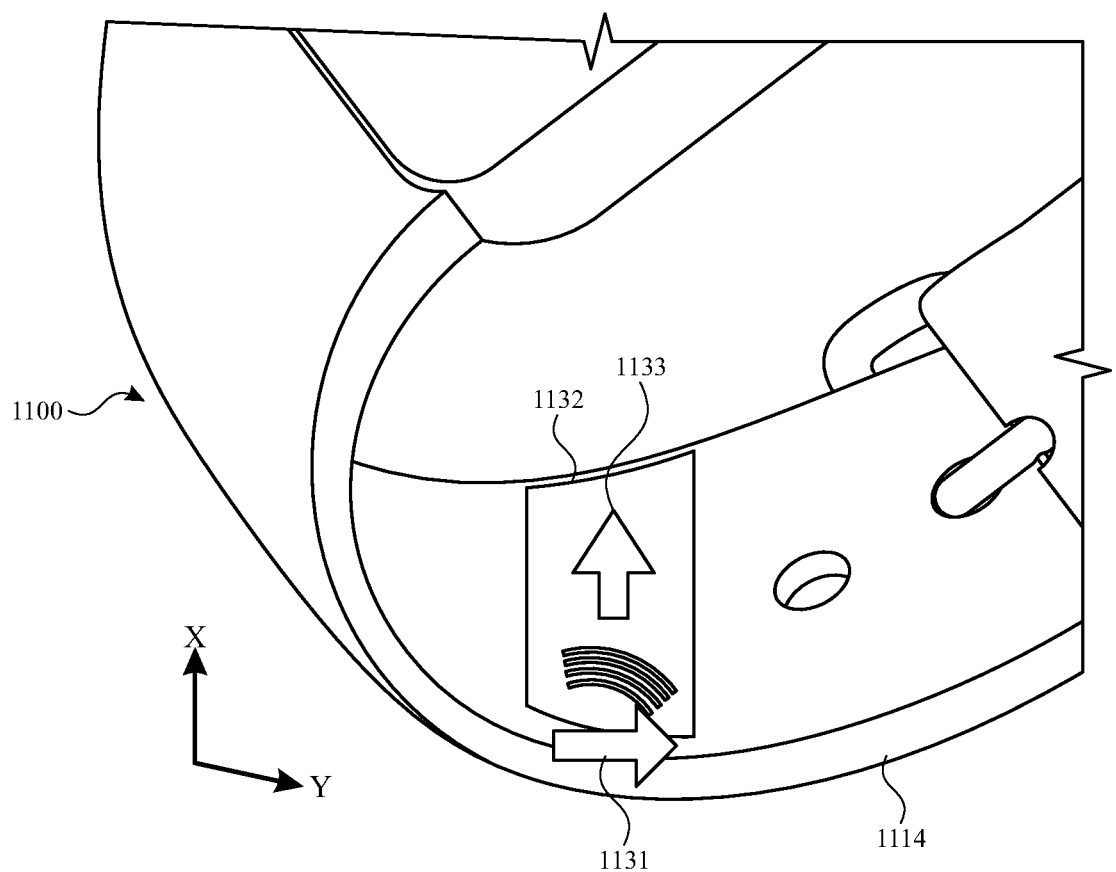
FIG. 11 illustrates an example device configured to generate tactile sensations according to examples of the disclosure.

FIG. 11 illustrates an example device configured to generate tactile sensations according to examples of the disclosure. Device 1100 can one or more transducer arrays 1132 arranged in and/or band 1114. The band can be coupled to second device (e.g., a smartwatch device) and couple to the body (e.g., the wrist) of a user. In some examples, the transducer arrays can be driven to provide haptic feedback to the user. For example, respective rows and/or columns of transducer array 1132 can be stimulated successively to provide the haptic feedback. In some examples, the successive stimulation can include driving adjacent rows, thus providing a sensation of haptic feedback traveling in a y-direction 1131. In some examples, the stimulation can include driving adjacent columns of transducers successively, thus providing a sensation of haptic feedback traveling in a x-direction 1133. In some examples, one or more portions of transducer array 1132 can be driven simultaneously, or nearly simultaneously, thus providing a pulsing sensation. For example, the entire transducer array can be driven at a selectable strength to provide global haptic feedback around the area of transducer array 1132. It can be appreciated that the embodiments directed to creating haptic feedback can combine to produce various patterns of haptic feedback. For example, one or more portions of the transducer array can be driven during different time periods, which can be used to garner the attention of the user (during a ringing alarm, upon a successful or unsuccessful selection of a user interface element, etc.).

In some examples, the haptic feedback can occur as a result of other sensing modalities. For example, a first one or more transducer arrays can be configured to detect touch and/or fingerprints of a user (e.g., on the exterior surface of a band). Additionally, a second one or more transducer arrays can be configured to generate haptic feedback (e.g., on the interior surface of a band). The first and second transducers can be arranged to transmit signals towards opposing faces of the band. In this way, a user of the device can have some indication that the device successfully has detected touch of the user. In some examples, the first transducers can detect contact between a finger of the user and the exterior of the band. In response to detecting the contact, the second one or more transducers can generate haptic feedback (e.g., a pulse, pattern, sweep in the x and/or y directions). Additionally or alternatively, while the position of contact is varied on the first (e.g., exterior) surface of the band, the first one or more transducers can detect the variation of position. For example, the variation of position can include a swipe gesture along the first surface of the band. While detecting the variation of position, transducers on a second (e.g., interior) surface of the band can be stimulated to generate haptic feedback such that the haptic feedback tracks the variation of position. For example, the path of a swipe gesture across the first surface of the band can be mirrored, or nearly mirrored, by a path of haptic feedback across the second surface of the band.

In some examples, the one or more transducer arrays can be beamformed to more precisely generate haptic feedback. As described previously, properties of stimulus (e.g., amplitude, phase, and/or the activation of the stimulus) can be varied over time to beamform the signals generated by a transducer array. This concept can optionally be extended to generate strong and precise haptic feedback. Specifically, the position and/or pattern of haptic feedback can be improved by beamforming the one or more transducer arrays.

In some examples, a plurality of ultrasonic waves at different respective frequencies can be generated to create repetitive haptic feedback detectable by a user of a device. For example, repetitive haptic feedback can include one or more instances of pressure exerted on the user by the device (e.g., once every few second, one or more times per second). In some examples, a first one or more transducers can be stimulated at a first frequency and a second one or more transducers can be stimulated at a second frequency, the second frequency different than the first. The first and second frequencies can be selected to improve transmission and reception of ultrasonic waves, for example from 100 kHz-30 MHz. As described previously, the one or more stimuli applied to respective transducers can additionally vary in amplitude and phase to beamform the signal at a particular location. In some examples, the ultrasonic transducers can be configured to emit pressure at a plurality of frequencies such that the constructive and/or destructive interference generate aggregate pressure waves that emulate a relatively low frequency of haptic feedback. For example, thousands of ultrasonic waves oscillating in the kilohertz frequency range can be transmitted and beamformed to emulate a pulsing sensation at particular locations.

Figure 12:
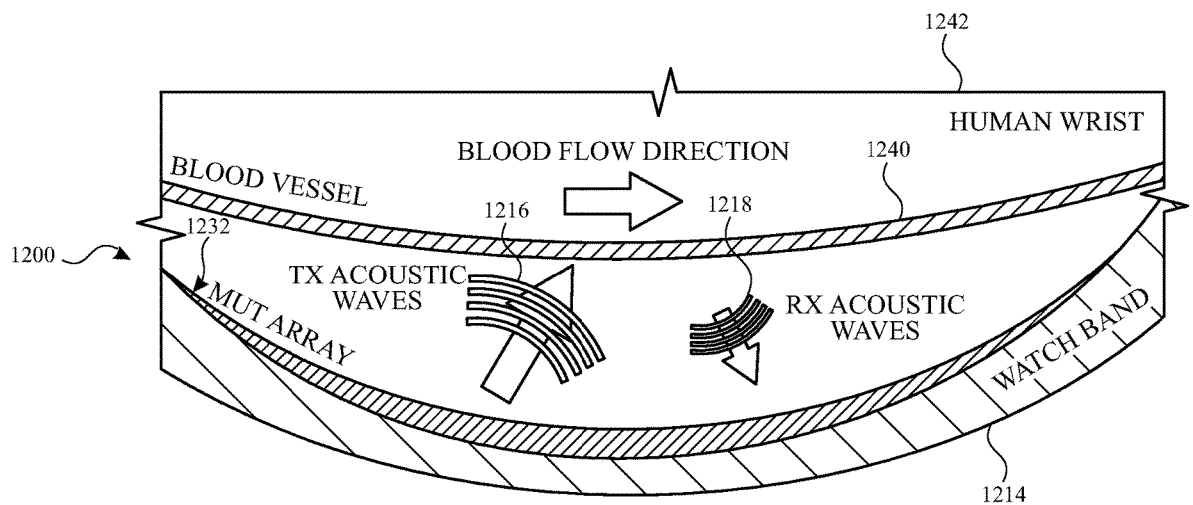
FIG. 12 illustrates an example device configured to detect physiological signals according to examples of the disclosure.

FIG. 12 illustrates an example device configured to detect physiological signals according to examples of the disclosure. Device 1200 can include a band 1214, and a transducer array 1232 arranged in proximity to the interior (e.g., proximal to the wrist 1242 of a user of device 1200) surface of band 1214. In some examples, transducer array 1232 can emit one or more incident ultrasonic waves 1216, which can reflect off a blood vessel 1240. Incident ultrasonic waves 1216 can partially or entirely bounce off blood vessel 1240, more reflected waves 1218 can be received by the transducer array 1232. In some examples, a first portion of the transducer array can direct incident ultrasonic waves 1216 at an angle such that the reflected waves 1218 are received at a second portion of the transducer array. In some examples, ultrasonic waves can comprise a series of time-separated pulses. Additionally or alternatively, the ultrasonic waves can be configured as one or more continuous waves. In some examples, the reflected waves can be processed and/or analyzed to detect a velocity of fluids (i.e., blood) flowing through blood vessel 1240. The velocity of blood flow can be further processed to provide indications of blood pressure associated with blood vessel 1240.

Figure 13:
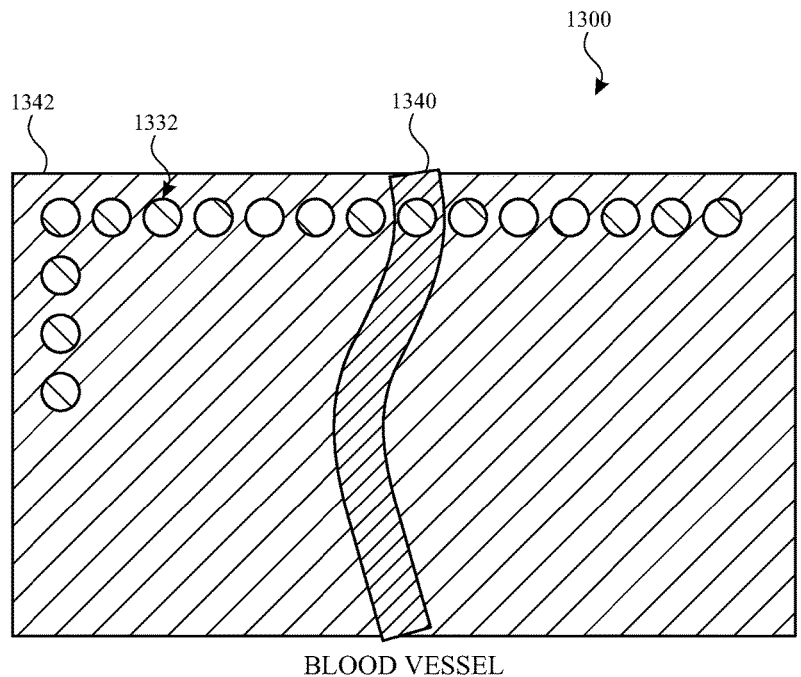
FIG. 13 illustrates an example device configured to detect physiological characteristics according to examples of the disclosure.

FIG. 13 illustrates an example device configured to detect physiological characteristics according to examples of the disclosure. Device 1300 can include a band 1342 and a plurality of transducers such as transducer array 1332 configured to detect the state and/or variation associated with the dimensions of blood vessel 1340. As described previously, transducer array 1332 can be configured to transmit ultrasonic waves towards a blood vessel 1340, analyzing the received signal physiological characteristics of blood vessel 1340. The physiological characteristics in some cases can be the width of the blood vessel. In this way, the continual variation (or lack thereof) of blood vessel 1340 dimensions can be monitored to image blood vessel 1340. In some examples, the transducer array can be configured to improve detection of dimensions of blood vessel 1340. For example, the relative dimensions and/or locations of respective transducers of transducer array 1332 can be selected to obtain a threshold image resolution of blood vessel 1340. In some examples, the dimensions of one or more blood vessels in a region can be imaged. Additionally or alternatively, transducer array 1332 can partially or entirely be configured to detect other physiological characteristics, including blood pressure and/or blood flow rate. In some examples, the imaged dimensions of blood vessels can be combined with other physiological characteristics to calculate further physiological signals associated with a user of device 1300. For example, the aggregate physiological characteristics can be used to generate a doppler vasculature ultrasound of the user.

In some examples, transducer arrays can be configured to transmit and receive data between two or more exemplary devices.

Figure 14:
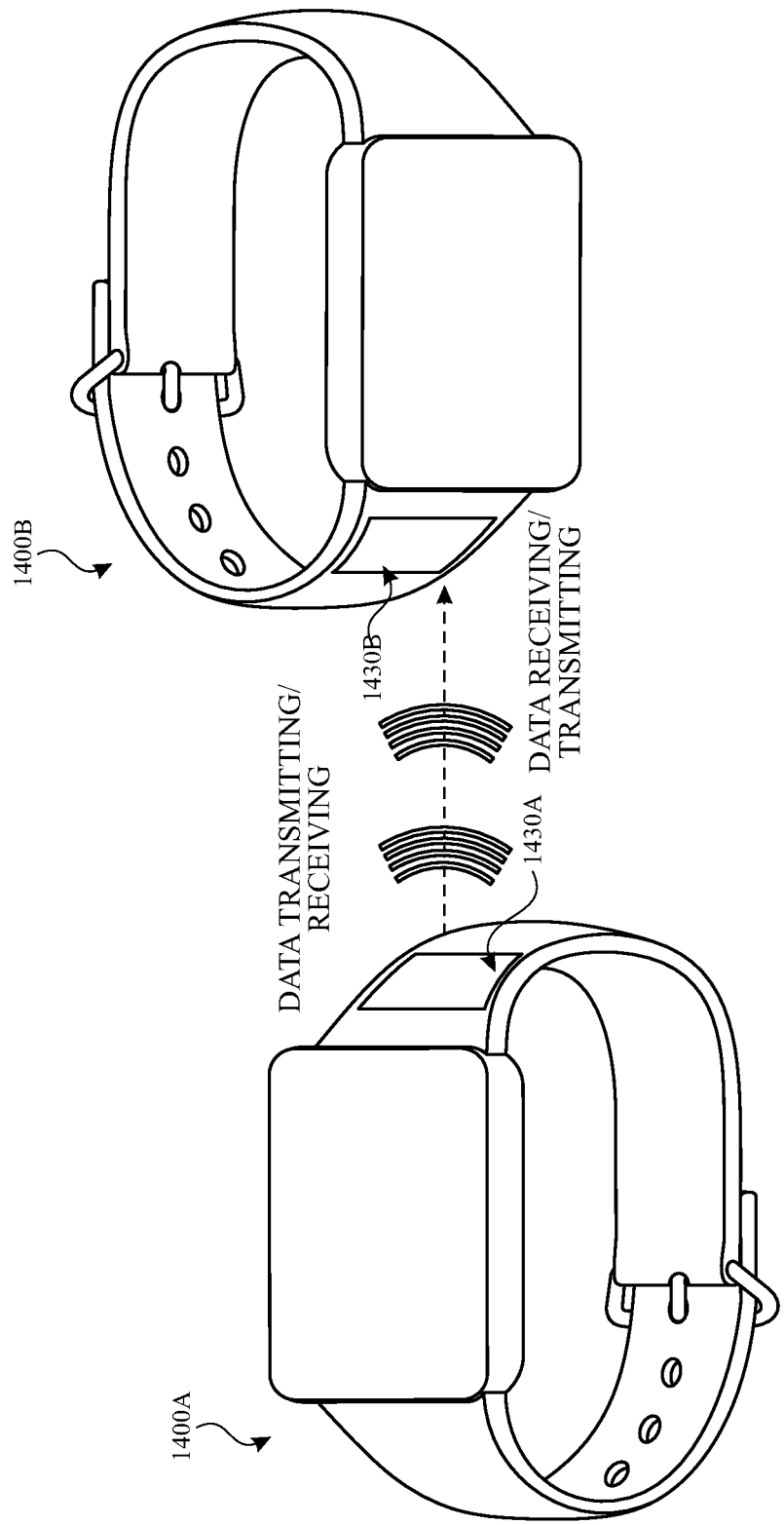
FIG. 14 illustrates an example of two devices configured to transmit and receive signals according to examples of the disclosure.

FIG. 14 illustrates an example of two devices configured to transmit and receive signals according to examples of the disclosure. Device 1400A and 1400B can respectively comprise one or more transducer arrays 1430A and 1430B. In some examples, device 1400A can be configured to transmit a signal to device 1400B. Device 1400A can record an instant in time when the signal is transmitted, and device 1400B can record an instant in time, or timestamp, when the signal is received at device 1400B. It is understood that the description signal transmission is not limiting, especially with respect to the content and communication protocols described herein. For example, the signal transmission does not necessarily have to include sending timestamp, provided some indication of the time associated with a propagation time of signals between devices and/or distance between devices can be communicated and/or otherwise calculated. In some examples, a processor (not shown) included in a respective device can be communicatively coupled to CMOS circuitry (not shown) that is coupled to one or more transducer arrays. In some examples, the device can use a shared encoding scheme, such that the transmission timestamp can be included in data sent between the devices. In some examples, the difference between the transmission timestamp and a reception timestamp (e.g., the time device 1400B receives the transmitted data) can be used to calculate the time-of-flight between device 1400A and 1400B. The time of flight can further be used to calculate the distance between device 1400A and 1400B. In the event the distance between the devices is less than a threshold distance, the respective devices can receive an indication that the threshold distance has been violated. This behavior can prove useful in epidemiological contexts, for example, to monitor a sufficient "social distance" is maintained between one or more users. Additionally or alternatively, the distance between two or more devices can be recorded (e.g., locally on the devices and/or on a device in communication with one or more devices such as a server). In some examples, particular wave patterns can be uniquely assigned to particular devices. Thus, in crowded environments, device 1400A can transmit a unique signal and/or data stream, which when received at device 1400B, can be decoded and be used to calculate a time of flight associated with the distance between device 1400A and 1400B, and not other devices.

In some examples, signals transmitted between the two or more devices can be configured to carry data. For example, one or more files can be sent between the devices, provided a suitable encoding scheme is selected for data transmission. In some examples, textual content (e.g., messages, notes) can be sent over the communication channel. In some examples, prior to data transmission, a communication channel can be established, and device verification can be performed. For example, the devices can exchange handshake signals to minimize any data transmission errors. Additionally or alternatively, device identification can be performed. For example, a respective device owner of devices 1400A and/or 1400B can be checked against a list of users that approved for communication, such as an address book.

Figure 15:
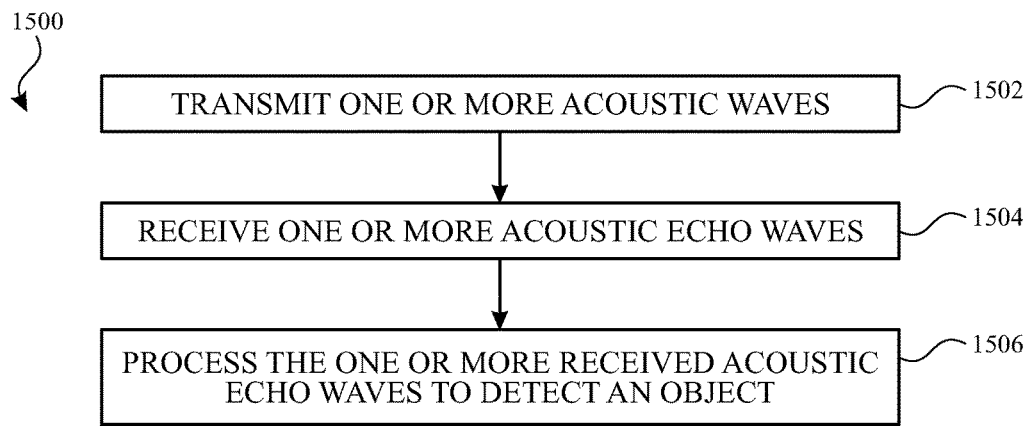
FIG. 15 illustrates an example flow diagram of transmitting and receiving signals according to examples of the disclosure.

FIG. 15 illustrates an example flow diagram of transmitting and receiving signals according to examples of the disclosure. Flow diagram 1500 illustrates an exemplary process of detecting an object in proximity to an exemplary device comprising a plurality of ultrasonic transducer arrays. In some examples, one or more acoustic waves are transmitted (e.g., toward an object) at step 1502. The one or more acoustic waves can propagate, and bounce off of, and object to create one or more acoustic echo waves. The exemplary device can receive the one or more acoustic echo waves at step 1504. The exemplary device can thereby process the one or more acoustic echo waves, optionally performing processing to determine location, motions, and/or other characteristics of the proximal object at step 1506. It can be appreciated that the embodiments described herein, where applicable, correspond to the logic illustrated in flow diagram 1500.

Figure 16:
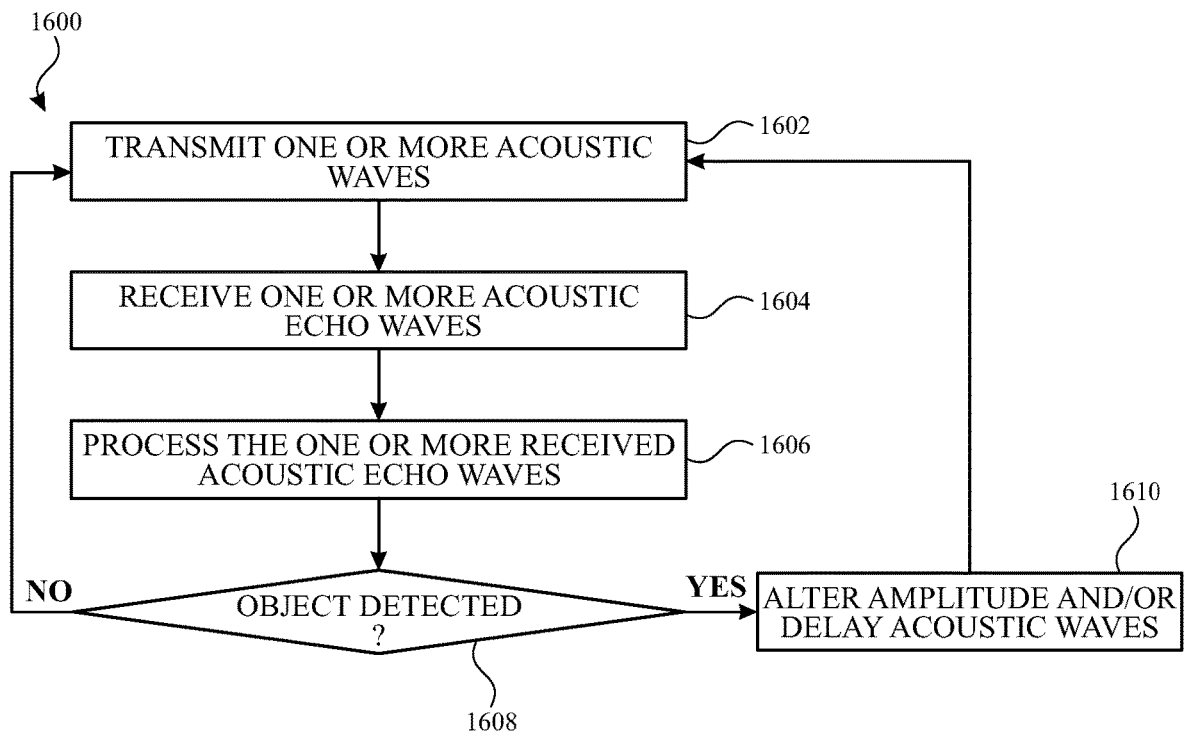
FIG. 16 illustrates an example flow diagram of beamforming according to examples of the disclosure.

FIG. 16 illustrates an example flow diagram of beamforming according to examples of the disclosure. Flow diagram 1600 illustrates an exemplary process of beamforming one or more signals of an exemplary device comprising a plurality of ultrasonic transducer arrays. In some examples, steps 1602 through 1606 can correspond to the steps described with respect to FIG. 15. In some examples, at a first time, the one or more acoustic waves can be configured to be transmitted to a broad area. If an object is not detected (e.g., "No" at step 1608), one or more acoustic waves can continue to be transmitted over the broad area. If an object is detected, (e.g., "Yes" at step 1608), multiplexing circuitry included in the exemplary device can alter the amplitude and/or delay signals associated during a subsequent transmission of one or more acoustic waves at step 1610 to steer an aggregate signal formed by the one or more transmitted acoustic waves. In some examples, the multiplexing circuitry can further introduce delays (e.g., with digital and/or analog circuitry and processing) to optionally improve directivity of signals received the one or more transducer arrays.

Therefore, according to the above, some examples of the disclosure are directed to a device comprising a wearable band, one or more arrays of piezoelectric transducers embedded in the wearable band and configured to transmit and receive acoustic waves, and multiplexing circuitry embedded in the wearable band and including a plurality of switches, wherein the multiplexing circuitry is coupled to the one or more arrays of piezoelectric transducers via a plurality of flexible traces. Additionally or alternatively to one or more of the examples disclosed above, in some examples the one or more arrays of piezoelectric transducers are configured to transmit first one or more acoustic waves to a second device, and the one or more arrays of piezoelectric transducers are configured to receive second one or more acoustic waves associated with a propagation time of the first one or more transmitted acoustic waves. Additionally or alternatively to one or more of the examples disclosed above, in some examples the one or more arrays of piezoelectric transducers are configured to detect contact on one or more surfaces of the wearable band. Additionally or alternatively to one or more of the examples disclosed above, in some examples the contact detection includes detecting a fingerprint of a user of the device. Additionally or alternatively to one or more of the examples disclosed above, in some examples the one or more arrays of piezoelectric transducers are further configured to transmit first one or more acoustic waves towards the finger of the user of the device, receive second one or more acoustic waves reflected by the finger, and detecting one or more characteristics of the finger based on the second one or more acoustic waves to assist in detecting a fingerprint. Additionally or alternatively to one or more of the examples disclosed above, in some examples the contact detection includes detecting a first location of the contact on the wearable band. Additionally or alternatively to one or more of the examples disclosed above, in some examples the contact detection comprises detecting movement of the contact from the first location to a second location on the wearable band. Additionally or alternatively to one or more of the examples disclosed above, in some examples the contact detection comprises detecting a force of the contact on the wearable band. Additionally or alternatively to one or more of the examples disclosed above, in some examples the device further comprises a processor communicatively coupled to the multiplexing circuitry and configured to receive first one or more signals to invoke one or more functions of the device. Additionally or alternatively to one or more of the examples disclosed above, in some examples the one or more arrays of piezoelectric transducers are configured to communicate data to a second device. Additionally or alternatively to one or more of the examples disclosed above, in some examples the one or more arrays of piezoelectric transducers are configured to detect gestures in proximity to the wearable band.

Some examples of the disclosure are directed to a device for transmitting and receiving acoustic waves, comprising a wearable band, one or more piezoelectric transducers embedded in the wearable band, including a first layer of one or more first top electrodes, a second layer of one or more second bottom electrodes, one or more piezoelectric materials disposed between the first layer of the one or more first top electrodes and the second layer of the one or more second bottom electrodes, and a base material coupled to the second layer of the one or more second bottom electrodes including one more cavities within the base material located below one or more first respective top electrodes of the first layer of the one or more first top electrodes. Additionally or alternatively to one or more of the examples disclosed above, in some examples the one or more first respective top electrodes of the first layer of the one or more first top electrodes have a first shape configured to increase electro-acoustic efficiency of the one or more first respective top electrodes associated with a sensing modality, and one or more second respective bottom electrodes of the second layer of the one or more second electrodes have a second shape configured to increase electro-acoustic efficiency of the one or more second respective bottom electrodes associated with the sensing modality. Additionally or alternatively to one or more of the examples disclosed above, in some examples the sensing modality includes touch detection. Additionally or alternatively to one or more of the examples disclosed above, in some examples the sensing modality includes gesture detection. Additionally or alternatively to one or more of the examples disclosed above, in some examples a first portion of the first respective top electrodes are configured for touch detection, a second portion of the first respective top electrodes are configured for gesture detection, a third portion of the second respective bottom electrodes are configured for touch detection, and a fourth portion of the second respective bottom electrodes are configured for gesture detection. Additionally or alternatively to one or more of the examples disclosed above, in some examples a respective transducer of the one or more piezoelectric transducers comprises a first respective top electrode of the first layer of the one or more first top electrodes, a first portion of piezoelectric materials of the one or more piezoelectric materials, wherein the first portion of piezoelectric materials includes an area underneath the first respective top electrode, a first portion of the second bottom electrodes, wherein the first portion of the second bottom electrodes includes an area underneath the first respective top electrode, and a first respective cavity of the one or more cavities configured to allow displacement of the respective transducer. Additionally or alternatively to one or more of the examples disclosed above, in some examples a respective transducer of the one or more piezoelectric transducers comprises a first respective top electrode of the first layer of the one or more first top electrodes, a first portion of piezoelectric materials of the one or more piezoelectric materials, wherein the first portion of piezoelectric materials includes an area underneath the first respective top electrode, a first portion of the second bottom electrodes, wherein the first portion of the second bottom electrodes includes an area underneath the first respective top electrode, and a first respective cavity of the one or more cavities configured to improve directivity of acoustic waves generated and received by the respective transducer.

Some examples of the disclosure are directed to a device comprising a wearable band, one or more arrays of piezoelectric transducers embedded in the wearable band, and control circuitry coupled to the one or more arrays of piezoelectric transducers, wherein the control circuitry is configured to alter one or both of an amplitude and delay of a plurality of ultrasonic waves generated by the one or more arrays of piezoelectric transducers, and cause the plurality of ultrasonic waves to be transmitted towards a user of the device. Additionally or alternatively to one or more of the examples disclosed above, in some examples the control circuitry is further configured to cause the one or more arrays of piezoelectric transducers to transmit the plurality of ultrasonic waves to generate a sensation of pressure on the user. Additionally or alternatively to one or more of the examples disclosed above, in some examples the control circuitry is further configured to cause the one or more arrays of piezoelectric transducers to transmit the plurality of ultrasonic waves to interfere constructively and destructively and produce one or more pulses of pressure over a first area to generate the sensation of pressure. Additionally or alternatively to one or more of the examples disclosed above, in some examples the control circuitry is further configured to cause the one or more arrays of piezoelectric transducers to, during a first time period, generate the sensation of pressure over the first area, and during a second time period, generate the sensation of pressure over a second area.

Some examples of the disclosure are directed to a method for generating haptic feedback to a wearer of an electronic device, comprising, within a wearable band, transmitting a plurality of ultrasonic waves towards the user of the electronic device, and altering one or both of an amplitude and delay of the transmitted plurality of ultrasonic waves to generate a sensation of pressure on the user. Additionally or alternatively to one or more of the examples disclosed above, in some examples the method further comprises causing the plurality of ultrasonic waves to interfere constructively and destructively, and generating one or more pulses of pressure over a first area to cause the sensation of pressure. Additionally or alternatively to one or more of the examples disclosed above, in some examples the method further comprises, during a first time period, during a first time period, generating the sensation of pressure over the first area, and during a second time period, generating the sensation of pressure over a second area. Additionally or alternatively to one or more of the examples disclosed above, in some examples the method further comprises altering one or both of an amplitude and delay of received ultrasonic waves.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A device comprising:
   a wearable band;
   one or more arrays of piezoelectric transducers embedded in the wearable band and configured to transmit and receive acoustic waves; and
   multiplexing circuitry embedded in the wearable band and including a plurality of switches, wherein the multiplexing circuitry is coupled to the one or more arrays of piezoelectric transducers via a plurality of flexible traces;
   wherein the one or more arrays of piezoelectric transducers are selectively configurable to wirelessly communicate data to a second electronic device, and are selectively configurable to generate a sensation of pressure on a user.

2. The device of claim 1, wherein:
   the one or more arrays of piezoelectric transducers are selectively configurable to transmit first one or more acoustic waves to an object; and
   the one or more arrays of piezoelectric transducers are selectively configurable to receive second one or more acoustic waves associated with a propagation time of the first one or more transmitted acoustic waves reflected off the object.

3. The device of claim 1, wherein the one or more arrays of piezoelectric transducers are selectively configurable to detect contact on one or more surfaces of the wearable band.

4. The device of claim 3, wherein the contact detection includes detecting a fingerprint of a user of the device.

5. The device of claim 4, wherein the one or more arrays of piezoelectric transducers are further selectively configurable to:
transmit first one or more acoustic waves towards a finger of the user of the device;
receive second one or more acoustic waves reflected by the finger; and
detect one or more characteristics of the finger based on the second one or more acoustic waves to assist in detecting the fingerprint.

6. The device of claim 3, wherein the contact detection includes detecting a first location of the contact on the wearable band.

7. The device of claim 6, wherein the contact detection comprises detecting movement of the contact from the first location to a second location on the wearable band.

8. The device of claim 3, wherein the contact detection comprises detecting a force of the contact on the wearable band.

9. The device of claim 1, further comprising a processor communicatively coupled to the multiplexing circuitry and configured to receive first one or more signals carrying data wirelessly received from the second device to invoke one or more functions of the device including calculating a distance between the device and the second electronic device and determining whether the distance violates a threshold distance criterion.

10. The device of claim 1, wherein the one or more arrays of piezoelectric transducers are selectively configurable to detect gestures in proximity to the wearable band.

11. A device comprising:
a wearable band;
one or more arrays of piezoelectric transducers embedded in the wearable band; and
control circuitry coupled to the one or more arrays of piezoelectric transducers;
wherein the control circuitry is configured to alter a time delay of a plurality of ultrasonic waves generated by the one or more arrays of piezoelectric transducers, and cause the plurality of ultrasonic waves to be transmitted towards a user of the device; and
wherein the control circuitry is further configured to cause the one or more arrays of piezoelectric transducers to transmit the plurality of ultrasonic waves to generate a sensation of pressure on the user.

12. The device of claim 11, wherein the control circuitry is further configured to cause the one or more arrays of piezoelectric transducers to transmit the plurality of ultrasonic waves to interfere constructively and destructively and produce one or more pulses of pressure over a first area to generate the sensation of pressure.

13. The device of claim 12, wherein the control circuitry is further configured to cause the one or more arrays of piezoelectric transducers to:
during a first time period, generate the sensation of pressure over the first area; and
during a second time period, generate the sensation of pressure over a second area.

14. A method for generating haptic feedback to a wearer of an electronic device, comprising:
within a wearable band,
transmitting a plurality of ultrasonic waves towards a user of the electronic device; and
altering a time delay of the transmitted plurality of ultrasonic waves to generate a sensation of pressure on the user.

15. The method of claim 14, further comprising causing the plurality of ultrasonic waves to interfere constructively and destructively, and generating one or more pulses of pressure over a first area to cause the sensation of pressure.

16. The method of claim 15, further comprising:
during a first time period, generating the sensation of pressure over the first area; and
during a second time period, generating the sensation of pressure over a second area.

* * * * *